United States Patent
Igaki et al.

(10) Patent No.: US 6,696,929 B2
(45) Date of Patent: Feb. 24, 2004

(54) VEHICLE WARNING APPARATUS FOR GENERATING WARNING SIGNAL DEPENDING UPON OPERATOR'S BRAKE OPERATING CHARACTERISTICS

(75) Inventors: Munenaga Igaki, Toyota (JP); Masakatsu Nonaka, Toyota (JP); Sueharu Nagiri, Aichi-gun (JP); Keiji Kuzuya, Nagoya (JP); Kazuya Watanabe, Anjo (JP); Masahiko Sakabe, Anjo (JP); Takayuki Nakasho, Toyota (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 78 days.

(21) Appl. No.: 09/990,292

(22) Filed: Nov. 23, 2001

(65) Prior Publication Data

US 2002/0101337 A1 Aug. 1, 2002

(30) Foreign Application Priority Data

Nov. 24, 2000 (JP) ........................................ 2000-357254
Sep. 10, 2001 (JP) ........................................ 2001-273015

(51) Int. Cl.[7] .................................................. B60Q 1/00
(52) U.S. Cl. ............. 340/435; 340/426.25; 340/426.32; 340/436; 340/466; 340/903; 340/904
(58) Field of Search ................................. 340/435, 436, 340/441, 444, 452, 453, 426.32, 426.24, 426.25, 457.3, 459, 466, 467, 464, 477, 903, 904, 905

(56) References Cited

U.S. PATENT DOCUMENTS

| 4,948,246 | A | * | 8/1990 | Shigematsu | 701/301 |
| 5,530,420 | A | * | 6/1996 | Tsuchiya et al. | 340/435 |
| 5,684,473 | A | * | 11/1997 | Hibino et al. | 340/903 |
| 5,850,254 | A | * | 12/1998 | Takano et al. | 340/903 |
| 5,865,265 | A | * | 2/1999 | Matsumoto | 340/901 |
| 5,948,035 | A | * | 9/1999 | Tomita | 701/70 |

FOREIGN PATENT DOCUMENTS

| JP | 6-231400 | * | 5/1993 |
| JP | A 6-231400 | | 8/1994 |

* cited by examiner

Primary Examiner—Jeffery Hofsass
Assistant Examiner—Daniel Previl
(74) Attorney, Agent, or Firm—Oliff & Berridge, PLC

(57) ABSTRACT

Warning apparatus for an automotive vehicle, operable to generate a warning signal when a distance between the vehicle and an object in front of the vehicle is shorter than a predetermined threshold value, the apparatus including a characteristic-value storage portion which stores at least one characteristic-value relationship between at least two of a plurality of brake operating characteristic values relating to a braking operation by an operator of the vehicle to brake the vehicle, and a threshold-value determining portion operable to determine the threshold value of the distance, on the basis of at least one of an estimated braking state of the vehicle estimated on the basis of the characteristic-value relationship stored in the characteristic-value storage portion, a running-state quantity indicative of a running state of the vehicle, and a moving-state quantity indicative of a moving state of the object.

17 Claims, 13 Drawing Sheets

DIAL-POSITION VALUE
(FREE RUNNING TIME)

DIAL-POSITION VALUE
(FREE RUNNING TIME)

VEHICLE WARNING APPARATUS FOR GENERATING WARNING SIGNAL DEPENDING UPON OPERATOR'S BRAKE OPERATING CHARACTERISTICS

This application is based on Japanese Patent Application Nos. 2000-357254 filed on Nov. 24, 2000 and 2001-273015 filed on Sep. 10, 2001, the contents of which are incorporated hereinto by reference.

BACKGROUND OF THE INVENTION

1. Field of the Invention

The present invention relates to a warning apparatus.

2. Discussion of Related Art

JP-A-6-231400 discloses a warning apparatus provided on an automotive vehicle to generate a warning signal or an alarm indication when a distance between the vehicle and an object in front of the vehicle has become shorter than a predetermined threshold value. In this warning apparatus, the threshold value of the distance is determined on the basis of a running speed, a free running time and a maximum deceleration value of the vehicle. The free running time and maximum deceleration value of the vehicle are set or determined for a specific operator or driver of the vehicle, on the basis of empirical data indicative of braking conditions of the vehicle in which the vehicle was braked by the specific operator in the past. Accordingly, the warning apparatus disclosed in the above-identified publication is capable of generating the warning signal at a timing that suits the particular vehicle operating or driving characteristic or habit of the specific operator.

SUMMARY OF THE INVENTION

It is therefore an object of the present invention to provide a warning apparatus provided on an automotive vehicle, which generates a warning signal at a timing that better suits a particular vehicle operating characteristic or habit of a specific operator of the vehicle, than the warning apparatus disclosed in the publication identified above.

The above object may be achieved according to any one of the following modes of the present invention in the form of a warning apparatus. Each of the following modes of the invention is numbered like the appended claims and depends from the other mode or modes, where appropriate, to indicate and clarify possible combinations of elements or technical features. It is to be understood that the present invention is not limited to the technical features or any combination thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A warning apparatus for an automotive vehicle, operable to generate a warning signal when a distance between the vehicle and an object existing in front of the vehicle is shorter than a predetermined threshold value, comprising:

a characteristic-value storage portion which stores at least one characteristic-value relationship between at least two of a plurality of brake operating characteristic values relating to a braking operation by an operator of the vehicle to brake the vehicle; and a threshold-value determining portion operable to determine the threshold value of the distance, on the basis of at least one of an estimated braking state of the vehicle estimated on the basis of the at least one characteristic-value relationship stored in the characteristic-value storage portion; a running-state quantity indicative of a running state of the vehicle; and a moving-state quantity indicative of a moving state of said object.

The warning apparatus according to the above mode (1) is arranged to generate a warning signal or provide a warning indication when the actual distance between the automotive vehicle in question (hereinafter referred to as "present vehicle") and the object in front of the present vehicle (e.g., a front vehicle running in front of the present vehicle, or a stationary object) has become smaller than the predetermined threshold value. In the present warning apparatus, the threshold value of the actual distance is determined on the basis of at least one of the estimated braking state of the present vehicle estimated on the at least one characteristic-value relationship between at least two brake operating characteristic values relating to the vehicle operator's braking operation to brake the present vehicle, the running-state quantity indicative of the running state of the present vehicle, and the moving-state quantity indicative of the moving state of the object. This arrangement permits the warning apparatus to generate the warning signal at a timing that better suits the specific brake operating characteristic or habit of the vehicle operator, than in the known warning apparatus.

Each characteristic-value relationship used is a relationship between two brake operating characteristic values relating to the vehicle operator's operation to apply a normal brake to the vehicle during normal running of the vehicle or to apply an emergency brake to the vehicle. The at least one characteristic-value relationship is selected depending upon the object of generating the warning signal. Each characteristic-value relationship used by the threshold-value determining portion may be determined either theoretically or experimentally. The case of the theoretical determination may be based on an human-oriented engineering technology. The characteristic-value relationship may be either held constant, or changed depending upon the running state of the present vehicle and the state of the roadway surface on which the present vehicle is running. Further, the characteristic-value relationship may be updated by a learning compensation technique. The at least one characteristic-value relationship may consist of only one relationship between two brake operating characteristic values, or at least two characteristic-value relationships among three or more brake operating characteristic values. In the latter case, the at least two characteristic-value relationships may consist of two or more relationships of one brake operating characteristic value with the other brake operating characteristic values, or two or more relationships of two or more brake operating characteristic values with respective two or more other brake operating characteristic values. Alternatively, two or more characteristic-value relationships are determined by each other in connection with each other, such that one brake operating characteristic value is related to another characteristic value, and a further characteristic value is related to the above-indicated one characteristic value, and so on.

The running-state quantity may include the running speed and/or acceleration value of the present vehicle, and the moving-state quantity of the object may similarly include the moving speed and/or acceleration value of the object. Where the running-state quantity include both of the running speed and acceleration value of the present vehicle while the moving-state quantity include both of the moving speed and acceleration value of the object, it is possible to obtain a relative speed and a relative acceleration value of the present vehicle and the object.

(2) A warning apparatus according to the above mode (1), wherein the characteristic-value storage portion stores at least two characteristic-value relationships of one of the plurality of brake operating characteristic values with respective at least two other characteristic values of the plurality of brake operating characteristic values, and the threshold-value determining portion is operable to estimate at least two braking-state quantities indicative of a braking state of the present vehicle, on the basis of the above-indicated one brake operating characteristic value and the characteristic-value relationships.

In the warning apparatus according to the above mode (2), the characteristic-value storage portion stores at least two characteristic-value relationships of one brake operating characteristic value with the other brake operating characteristic values. Accordingly, at least two braking-state quantities of the present vehicle can be obtained on the basis of the above-indicted one brake operating characteristic value and the at least two characteristic-value relationships.

(3) A warning apparatus according to the above mode (1) or (2), wherein the characteristic-value storage portion stores at least one characteristic-value relationship selected from a plurality of relationships between or among at least two of; (a) an operating-speed quantity relating to a speed of the braking operation by the operator to brake the vehicle; (b) a vehicle-deceleration quantity indicative of a deceleration value relating to the vehicle as a result of the braking operation by the vehicle to brake the vehicle; and (c) a relative-position quantity relating to a relative position between the vehicle and the object upon the braking operation.

In the warning apparatus according to the above mode (3), the characteristic-value storage portion stores at least one of: (i) a relationship between the operating-speed quantity and the vehicle-deceleration quantity; (ii) a relationship between the operating-speed quantity and the relative-position quantity; (iii) a relationship between the vehicle-deceleration quantity and the relative-position quantity; and (iv) a relationship among the operating-speed quantity, the vehicle-deceleration quantity and the relative-position quantity.

For instance, the operating-speed quantity may be a speed value or values relating to an operation of a manually operable brake operating member by the vehicle operator. For example, the operating-speed quantity includes a statistically processed value of one or both of (i) a speed of switching of the vehicle operator from an operation of an accelerator pedal of the vehicle to an operation of the brake operating member (brake pedal), and (ii) a speed of operation of the brake operating member. The operating-speed quantity may include a required time of the operator's braking operation, and/or a rate of increase of the above-indicated speed of the braking operation. In this respect, it is noted that the required time decreases with an increase of the speed of the operator's braking operation, and that the rate of increase of the above-indicated speed increases with the increase of the speed of the operator's braking operation.

As described below, the operating-speed quantity is determined by the vehicle operator, that is, by the mental factors and locomotive capacity of the vehicle operator. For instance, a hasty or prompt vehicle operator tends to perform the braking operation at a higher speed than a gentle or slow vehicle operator, and a vehicle operator who likes to drive a vehicle in a sporty fashion tends to perform the braking operation at a higher speed than a vehicle driver who likes to drive a vehicle in a steady fashion. Further, the upper limit of the speed of the braking operation may be determined by the locomotive capacity of the vehicle operator. In addition, the speed of the braking operation of the same operator tends to be higher when the operator is relatively strained or tense than when the operator is not relatively relaxed. Thus, the operating-speed quantity consists of at lest one value suitable for accurate evaluation of the mental states or factors and locomotive capacity of the specific vehicle operator.

The vehicle-deceleration quantity includes not only a deceleration value of the present vehicle per se, but also amounts of operation of the brake operating member by the vehicle operator, such as the operating force and stroke, a braking force produced as a result of the operator's operation of the brake operating member, and a ratio of utilization of the friction force between the vehicle wheels and the roadway surface. For instance, the ratio of utilization of the friction force may be represented by a ratio of the actual deceleration value of the present vehicle to a maximum deceleration value which is determined by the friction coefficient of the roadway surface. While the actual deceleration value of the vehicle is lower than the maximum deceleration value, the actual deceleration value increases with an increase of the amount of operation of the brake operating member, and therefore the ratio of utilization of the friction force increases with the increase of the amount of operation of the brake operating member. When the friction coefficient of the roadway surface is relatively low, the maximum deceleration value is relatively low. In this case, the vehicle operator generally adjusts the operating amount of the brake operating member so that the actual deceleration value does not exceed the relatively low maximum deceleration value. Accordingly, the actual deceleration value of the vehicle increases with an increase of the operating amount of the brake operating member. When the friction coefficient of the roadway surface is relatively low, the ratio of utilization of the friction force is generally higher than when the friction coefficient is relatively high. However, the actual deceleration value and the ratio of utilization of the friction force increase as the operating amount of the brake operating member is increased. In this respect, the ratio of utilization of the friction force can be used as the vehicle-deceleration quantity. The actual deceleration value of the present vehicle for a given value of the friction coefficient of the roadway surface can be obtained on the basis of the ratio of utilization of the friction force. However, the actual deceleration values for different values of the friction coefficient of the roadway surface cannot be obtained on the basis of only the ratio of utilization of the friction force. Where the ratio of utilization of the friction force and the friction coefficient of the roadway surface are both known, the actual deceleration value of the vehicle can be obtained. Therefore, the ratio of utilization of the friction force and the friction coefficient of the roadway surface may preferably be used as the vehicle-deceleration quantity.

The relative-position quantity may include a distance between the distance between the present vehicle and the object in front of the present vehicle, and a state of change of this distance. The distance between the vehicle and the front object may be an absolute distance, or a distance as felt by the vehicle operator. Even when the actual distance between the present vehicle and the object is constant, the distance as felt by the vehicle operator is shorter than the actual distance, where the relative speed between the vehicle and the object (the speed at which the present vehicle is approaching the object) or the running speed of the present vehicle is relatively high. The distance as felt by the vehicle operator may be obtained by dividing the distance between the vehicle and the object, by the running speed of the vehicle or the speed at which the vehicle is approaching the object. The state of change of the distance may include the relative speed of the vehicle and the front object, and the relative acceleration value (a rate at which the vehicle and the object are moving toward or away from each other).

Between the operating-speed quantity and the vehicle-deceleration value, there is a relationship or tendency that a vehicle operator having a relatively high speed of the braking operation has a relatively high deceleration value of the vehicle, while a vehicle operator having a relatively low speed of the braking speed has a relatively low deceleration value of the vehicle. Between the operating-speed quantity and the relative-position quantity, on the other hand, there is a relationship or tendency that the vehicle operator having a relatively high speed of the braking operation has a relatively short distance between the present vehicle and the front object, while the vehicle operator having a relatively low speed of the braking operation has a relatively long distance between the vehicle and the object. These relationships or tendencies were confirmed by experiments. Accordingly, the determination of the threshold value of the distance on the basis of these tendencies permits the warning apparatus to generate a warning signal at a timing that best suits the specific brake operating characteristic or habit of the particular operator of the vehicle.

(4) A warning apparatus according to any one of the above modes (1)–(3), wherein the characteristic-value storage portion stores at least one characteristic-value relationship selected from a plurality of relationships between or among at least two of: (a) a desired-safety-margin quantity relating to a safety margin desired by the operator in connection with the braking operation by the operator to brake the vehicle, (b) a required-vehicle-deceleration quantity relating to a required deceleration value of the vehicle as felt by the operator upon the braking operation, and (c) a critical-relative-position quantity relating to a relative position between the vehicle and the object at which the operator feels it necessary to initiate the braking operation.

The desired safety margin relates to a degree of necessity of the braking operation as felt by the vehicle operator. The desired safety margin is relatively large when the degree of necessity of the braking operation as felt by the operator is relatively low during a normal running of the vehicle. The desired safety margin is a degree of the safety margin desired or preferred by the vehicle operator in connection with the braking operation. For instance, a gentle or slow vehicle operator tends to desire a higher degree of safety margin in the braking operation than a hasty or prompt vehicle operator, while a vehicle operator who likes to drive the vehicle in a steady fashion tends to desire a higher degree of safety margin in the braking operation than a vehicle operator who likes to drive the vehicle in a sporty fashion. The same vehicle operator has a higher degree of safety margin when the operator is relatively strained than when the operator is relatively relaxed. The desired safety margin is determined primarily by the operating characteristic or habit and the metal states of the vehicle operator. The vehicle operator whose desired safety margin is relatively large generally initiates the braking operation at a relatively early point of time, than the vehicle operator whose desired safety margin is relatively small.

The vehicle operator whose desired safety margin is relatively large usually operates the brake operating member at a relatively low speed, than the vehicle operator whose desired safety margin is relatively small. In this sense, the desired safety margin per se is a subjective value as felt by the vehicle operator, and can be adjusted into an objective value on the basis of the operating-speed quantity described above with respect to the above mode (3). Accordingly, the desired-safety-margin quantity is suitable to estimate the required braking distance of the vehicle during a normal running of the vehicle, and suitable to determine the threshold value of the distance between the vehicle and the object which is used to determine whether the warning signal is generated or not, during the normal running of the vehicle.

The deceleration value of the vehicle as a result of the braking operation by the vehicle operator is usually determined by the metal state of the vehicle operator. For instance, the vehicle operator whose desired safety margin is relatively large tends to perform the braking operation that results in a lower value of deceleration of the vehicle, than the vehicle whose desired safety margin is relatively small.

The critical-relative-position quantity relating to the relative position between the vehicle and the object at which the vehicle operator feels it necessary to initiate the braking operation is usually determined by the metal state of the vehicle operator. For instance, the vehicle operator whose desired safety margin is relatively large tends to feel it necessary to initiate the braking operation when the distance between the vehicle and the object is larger, than the vehicle operator whose desired safety margin is relatively small.

(5) A warning apparatus according to any one of the above modes (1)–(5), wherein the characteristic-value storage portion stores at least one characteristic-value relationship selected from a plurality of relationships between or among at least two of: (a) a promptness quantity relating to promptness of the operator to perform the braking operation; (b) an operating-force quantity relating to an operating force to be produced by the operator to perform the braking operation; and (c) a critical-relative-position quantity relating to a relative position between the vehicle and the object at which the operator feels it necessary to initiate the braking operation.

The promptness quantity is a quantity indicative of one of the locomotive capacity values of the vehicle operator which relates to the promptness to perform the braking operation. A vehicle operator having a relatively high degree of locomotive capacity, for instance, a vehicle operator having a relatively high athletic response is capable of performing the braking operation at a relatively high speed. In this sense, the promptness may be represented by the operating-speed quantity described above with respect to the above mode (3) of this invention. Since the upper limit of the speed of the braking operation by the operator is determined by the locomotive capacity of the operator, the operator is not able to operate the brake operating member at a speed higher than a value corresponding to the locomotive capacity of the operator. For example, a time duration from a moment at which the operator feels it necessary to initiate the braking operation to a moment at which the braking operation is actually initiated is a quantity accurately representative of the brake operating promptness of the operator. This time duration is generally referred to as "free running time" of the vehicle. The lower limit or minimum value of this free running time may be suitably used to determine the threshold value of the distance between the vehicle and the front object, which is used to determine whether the warning signal should be generated or not.

The operating-force quantity includes: an operating force and an operating stroke of the brake operating member operated by the vehicle operator; a braking force produced as a result of the braking operation by the vehicle operator;

a deceleration value of the vehicle established as a result of the braking operation; a ratio of utilization of the friction force between the vehicle wheels and the roadway surface; and the friction coefficient of the roadway surface. The operating-force quantity is also generally determined by the locomotive capacity of the operator. The vehicle operator having a relatively high degree of locomotive capacity (and usually a relatively high level of promptness) tends to operate the brake operating member with a relatively large operating force. Since the vehicle operator tends to control the operating force of the brake operating member so as to establish a deceleration value of the vehicle which the vehicle operator feels necessary, the operating-force quantity may be represented by the required-vehicle-deceleration quantity described above with respect to the above mode (4).

The critical-relative-position quantity as felt by the vehicle operator is also generally determined by the locomotive capacity of the operator, in particular, by the promptness. The vehicle operator having a relatively high degree of locomotive capacity has a relatively long critical distance between the vehicle and the front object, at which the operator feels it necessary to initiate the braking operation.

(6) A warning apparatus according to any one of the above modes (1)–(5), wherein the characteristic-value storage portion stores at least one of:

(a) a relationship between a braking-delay time between a moment at which the operator feels it necessary to initiate the braking operation and a moment at which the braking operation is actually initiated, and a deceleration value of the vehicle to be established by the braking operation; and (b) a relationship between the braking-delay time and a relative-position quantity relating to a relative position between the vehicle and the object.

In the warning apparatus according to the above mode (6), the characteristic-value storage portion stores at least one of the two characteristic-value relationships (a) and (b) indicated above.

The braking-delay time is a time duration between the moment at which the vehicle operator feels it necessary to initiate the braking operation and the moment of the actual initiation of the braking operation. The moment at which the vehicle operator feels it necessary to initiate the braking operation may be detected by detecting a moment at which the accelerator pedal of the vehicle is released, or by detecting that the relative-position quantity has reached a predetermined value. The moment at which the vehicle operator feels it necessary to initiate the braking operation may also be detected by detecting a sudden increase of the tension or strain of the vehicle operator. For instance, the moment at which the vehicle operator feels a necessity of rapid or large brake application to the vehicle may be detected by detecting a moment at which the force of gripping of the steering wheel of the vehicle by the operator has increased to a predetermined upper limit, a moment at which the pressure acting on the operator's seat has increased to a predetermined upper limit, or a moment at which the operator's heart pulse rate has reached a predetermined upper limit.

The relative-position quantity may be a quantity at a moment of the actual initiation of the braking operation, a quantity at a moment at which the operator feels it necessary to initiate the braking operation, or a quantity determined by those two quantities.

(7) A warning apparatus according to any one of the above modes (1)–(6), further comprising a characteristic-value setting portion manually operable by the operator to set at least one of the above-indicated at least two of the plurality of brake operating characteristic values in the above mode (1), and the threshold-value determining portion is operable to obtain the estimated braking state of the vehicle on the basis of the above-indicated at least one brake operating characteristic value set by the characteristic-value setting portion and the above-indicated at least one characteristic-value relationship stored in the characteristic-value storage portion, the threshold-value determining portion determining the threshold value of the distance on the basis of the estimated braking state obtained.

For instance, one of the two brake operating characteristic values of one of the at least one characteristic-value relationship is set by the manually operable characteristic-value setting portion. In this case, the warning apparatus permits generation of a warning signal at a timing that suits the specific vehicle operator who has set the specific characteristic value.

Where the characteristic value that is set by the characteristic-value setting portion is a value which is influenced by the mental factors and locomotive capacity of the vehicle operator, the timing at which the warning apparatus can be activated to generate the warning signal is further optimized in accordance with the specific metal factors and locomotive capacity of the specific operator. The desired-safety-margin quantity described above with respect to the above mode (4) and the promptness quantity described above with respect to the above mode (5) may be used as values suitably set by the operator with the characteristic-value setting portion. While these quantities change with different vehicle operators, they may also change depending upon the mental states and/or physical conditions of the same operator.

(8) A warning apparatus according to any one of the above modes (1)–(7), further comprising:

a friction-coefficient obtaining portion operable to obtain a friction coefficient of a roadway surface on which the vehicle is running; and a characteristic-value-relationship determining portion operable to determine the above-indicated at least one characteristic-value relationship on the basis of the friction coefficient obtained by the friction-coefficient obtaining portion.

In the warning apparatus according to the above mode (8), each characteristic-value relationship is determined on the basis of the friction coefficient of the roadway surface. For instance, the characteristic-value storage portion may store a plurality of characteristic-value relationships corresponding to respective different values of the friction coefficient of the roadway surface, and the characteristic-value-relationship determining portion selects one of those stored characteristic-value relationships which corresponds to the friction coefficient value obtained by the friction-coefficient obtaining portion. Alternatively, the characteristic-value-relationship determining portion is arranged to determine the characteristic-value relationship depending upon the obtained friction coefficient value. Further alternatively, the characteristic-value storage portion stores a nominal characteristic-value relationship corresponding to a reference value of the friction coefficient of the roadway surface (e.g., the friction coefficient value of a dry asphalt roadway surface), and the characteristic-value-relationship determining portion is arranged to change this nominal characteristic-value relationship depending upon an amount of deviation of the obtained actual friction coefficient value from the reference value.

As described above, the deceleration value of the vehicle has a close relationship with the actual friction coefficient of the roadway surface, and the desired safety margin (mental state) of the vehicle operator is also influenced by the friction coefficient. For instance, the tension of the vehicle operator is higher when the friction coefficient of the roadway surface is relatively low than when it is relatively high. Accordingly, the time duration between the moment at which the vehicle operator feels it necessary to initiate the braking operation and the moment at which the braking operation is actually initiated tends to be shorter when the friction coefficient is relatively low. In this respect, it is desirable to determine the characteristic-value relationship depending upon the friction coefficient of the roadway surface.

Where a wheel of the vehicle is provided with a friction brake for braking the wheel by forcing a friction member onto a rotor rotating with the wheel, the friction coefficient of the roadway surface may be obtained on the basis of a state of change of the rotating speed of the wheel while the friction member is held forced onto the rotor with a predetermined pressing force for a predetermined time. When the friction coefficient is sufficiently high, the deceleration value of the vehicle corresponds to the pressing force. When the friction coefficient is relatively low, the vehicle deceleration value may be lower than a value corresponding to the pressing force. In this latter case, the vehicle deceleration value cannot exceed a value corresponding to the friction coefficient. Thus, the vehicle deceleration value may not be increased to a value corresponding to the wheel braking force when the friction coefficient is relatively low.

(9) A warning apparatus according to any one of the above modes (1)–(8), further comprising:

a running-environment obtaining portion operable to obtain a running environment of the vehicle; and a characteristic-value-relationship determining portion operable to determine the above-indicated at least one characteristic-value relationship on the basis of the running environment obtained by the running-environment obtaining portion.

In the warning apparatus according to the above mode (9), each characteristic-value relationship is determined on the basis of the running environment of the vehicle. The running environment includes: a condition of the roadway surface; a kind of the roadway; and environmental conditions such as the weather condition. The condition of the roadway surface includes the friction coefficient and the roughness or bumpiness of the surface. The kind of the roadway includes its running speed limit, and whether the roadway is an expressway or an ordinary roadway. The environmental conditions include a fine weather, a rainy weather, a snow fall, and a fog. The running environment of the vehicle described above has a considerable influence on the metal states of the vehicle operator. In this respect, it is desirable to determine the characteristic-value relationship on the basis of the running environment of the vehicle.

(10) A warning apparatus according to any one of the above modes (1)–(9), further comprising:

a running-state obtaining portion operable to obtain the running state of the vehicle; and a characteristic-value-relationship determining portion operable to determine the above-indicated at least one characteristic-value relationship on the basis of the running state obtained by the running-state obtaining portion.

In the warning apparatus according to the above mode (10), each characteristic-value relationship is determined on the basis of the running state of the vehicle. The running state includes: a state in which the drive wheels of the vehicle are driven; a state in which the vehicle is braked; a state in which the vehicle is turning; and a state in which the running condition is controlled. The running state may be represented by the operating states of the accelerator pedal, the brake operating member (brake pedal) and the steering wheel, and operating states of various switches provided to establish respective running modes of the vehicle.

For example, the braking-delay time described above with respect to the above mode (6) is relatively long while the vehicle drive wheels are driven or the vehicle is turning, and is relatively short while the vehicle is braked. On the other hand, the distance between the vehicle and the front object, at which the vehicle operator feels it necessary to increase the braking force, is relatively short while the vehicle is braked, since the vehicle operator operating the brake operating member is likely to feel that the distance is long enough to assure safety of running of the vehicle. Where the vehicle is running in a running mode so as to maintain a predetermined relative position between the vehicle and the front object, the vehicle operator is generally relaxed, so that the braking-delay time is accordingly increased. Thus, it is desirable to determine the characteristic-value relationship on the basis of the running state of the vehicle.

The warning apparatus according to the above mode (8), (9) or (10) is arranged to determine each characteristic-value relationship on the basis of the friction coefficient of the roadway surface, the running environment or state of the vehicle. However, the threshold-value determining portion may be arranged to determine the threshold value of the distance between the vehicle and the front object, on the basis of the friction coefficient, or the running environment or state of the vehicle. That is, the threshold value is increased or reduced depending upon a change of the friction coefficient or the running environment or state of the vehicle.

(11) A warning apparatus according to any one of the above modes (1)–(10), wherein the vehicle has a controlled running mode in which the running state is controlled on the basis of a relative-position quantity elating to a relative position between the vehicle and the object, and the threshold-value determining portion determines the threshold value of the distance such that the determined threshold value is larger when the vehicle is running in the controlled running mode, than when the vehicle is not running in the controlled running mode.

In the controlled running mode in which the running state of the vehicle is controlled on the basis of the relative-position quantity, the vehicle operator tends to be relaxed, and careless. In view of this tendency, it is desirable to determine the threshold distance to be comparatively long in the controlled running mode.

The threshold value of the distance may be determined on the basis of the running state or environment of the vehicle described above. The threshold value is desirably determined to be comparatively long when the drive wheels are driven, and to be comparatively short when the vehicle is braked. In this respect, it is noted that the braking-delay time tends to be long when the drive wheels are driven with the accelerator pedal being depressed, and that the necessity of generating the warning signal is relatively low during braking of the vehicle. The warning signal if generated during braking of the vehicle is usually annoying to the vehicle operator. Further, it is desirable to determine the threshold value to be larger when it is raining, snowing or foggy, than when it is fine, or when the friction coefficient of the roadway surface is lower than a predetermined threshold than when the friction coefficient is not lower than the threshold.

Alternatively, the threshold value of the distance may be determined on the basis of the moving state of the front object. For instance, the threshold value is determined to be relatively large when the acceleration value of the object is extremely low (when the deceleration value is extremely high).

(12) A warning apparatus according to any one of the above modes (1)–(11), further comprising a safety detecting portion operable to determine whether a positional relationship between the vehicle and the object falls within a predetermined safe region, and the threshold-value determining portion determines the threshold value of the distance when the safety detecting portion determines that the positional relationship does not fall within the safe region.

When the positional relationship between the vehicle and the object is within the safe region, it is not necessary to generate the warning signal, and is therefore not necessary to determine the threshold value of the distance between the vehicle and the object. A determination as to whether the positional relationship is within the safe region may be made by determining whether at least one of the running speed and acceleration value of the vehicle, the moving speed and acceleration of the front object, and the free running time of the vehicle satisfies a predetermined condition of safety.

In the warning apparatus wherein the threshold value of the distance is determined when the positional relationship between the vehicle and the front object is not within the predetermined safe region, a condition in which the positional relationship is not within the safe region may be considered to a condition in which a pre-warning condition to determine whether the distance is shorter than the threshold value is satisfied. When this pre-warning condition is satisfied, there is a relatively high possibility that the distance between the vehicle and the front object will become shorter than the predetermined threshold value, that is, there is a relatively high possibility that the warning signal should be generated. The pre-warning condition may be considered to be a condition in which it is required to determine whether the warning signal should be generated.

(13) A warning apparatus according to any one of the above modes (1)–(12), further comprising a running control portion operable to control the running state of the vehicle on the basis of a relative-position quantity relating to a relative position between the vehicle and the object.

The warning apparatus according to the above mode (13) is capable of controlling the running state of the vehicle on the basis of the relative-position quantity, for instance, such that the positional relationship between the vehicle and the front object coincides with a predetermined relationship. In this case, the warning apparatus may be arranged to generate the waning signal while the running state of the vehicle is controlled by the running control portion, or while the running state is not controlled.

(14) A warning apparatus for an automotive vehicle, operable to generate a warning signal when a distance between the vehicle and an object existing in front of the vehicle is shorter than a predetermined threshold value, characterized by comprising a threshold-value determining portion operable to determine the threshold value of said distance, on the basis of at least one of:

(a) an estimated braking-delay time which is an estimated time duration between a moment at which an operator of the vehicle feels it necessary to initiate a braking operation to brake the vehicle and a moment at which the braking operation is actually initiated;

(b) an estimated vehicle deceleration value which is an estimated value of deceleration of the vehicle as a result of the raking operation by the operator;

(c) a critical-relative-position quantity relating to a relative position between the vehicle and the object at which the operator feels it necessary to initiate the braking operation; and (d) a moving-state quantity indicative of a moving sate of the object.

In the warning apparatus according to the above mode (14), the threshold value of the distance used to determine whether the warning signal should be generated is determined on the basis of at least one of the estimated-braking-delay time, the estimated vehicle deceleration value of the vehicle, the critical-relative-position quantity and the moving-state quantity indicative of the moving state of the object. The vehicle operator may manually set at least one of the estimated braking-delay time, estimated deceleration value of the vehicle and critical-relative-position quantity. Alternatively, at least one of those three parameters may be determined on the basis of the past operating conditions of the vehicle, or may be a predetermined value.

The technical features according to any one of the above modes (1)–(13) is applicable to the warning apparatus according to the above mode (14).

(15) A warning apparatus for an automotive vehicle, operable to generate a warning signal when a relative-position quantity relating to a relative position between the vehicle and an object in front of the vehicle is on a predetermined one side of a predetermined threshold value on which a distance between the vehicle and the object is shorter than on the other side, characterized by comprising:

a characteristic-value storage portion which stores at least one characteristic-value relationship between at least two of a plurality of brake operating characteristic values relating to a braking operation by an operator of the vehicle to brake the vehicle; and a threshold-value determining portion operable to determine the threshold value of the relative-position quantity on the basis of at least one of: an estimated braking state of the vehicle estimated on the basis of the above-indicated at least one characteristic-value relationship stored in the characteristic-value storage portion; and a moving-state quantity indicative of a moving state of the object.

The relative-position quantity may be a distance between the vehicle and the front object, or the distance divided by the relative speed of the vehicle and the object. The technical feature according to any one of the above modes (1)–(14) is applicable to the warning apparatus according to the above mode (15).

(16) A warning apparatus for an automotive vehicle, operable to generate a warning signal when a distance between the vehicle and an object existing in front of the vehicle is shorter than a predetermined threshold value, characterized by comprising a threshold-value determining portion operable to determine the threshold value of the distance on the basis of at least one of (a) a running state of the vehicle and (b) a running environment of the vehicle, and at least one of (i) a running-state quantity indicative of the running state of the vehicle and (ii) a moving-state quantity indicative of a moving state of the object.

The technical features according to any one of the above modes (1)–(15) is applicable to the warning apparatus according to the above mode (16).

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
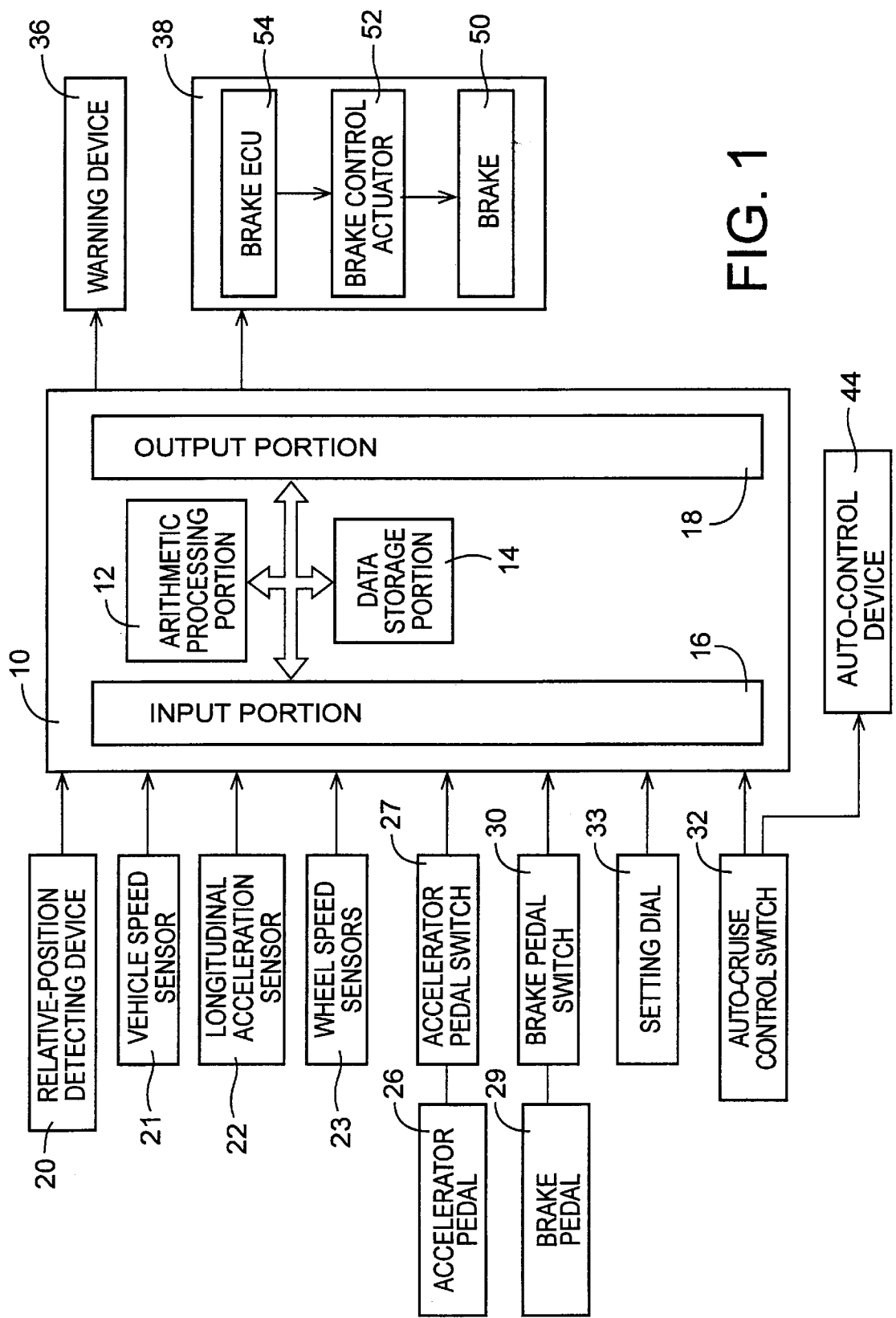
FIG. 1 is a view showing an overall arrangement of a warning apparatus constructed according to one embodiment of the present invention.

Referring first to FIG. 1, there is shown a warning apparatus which is provided on an automotive vehicle and constructed according to one embodiment of the present invention. The warning apparatus includes a warning control device 10 which is constituted primarily by a computer. The warning control device 10 incorporates an arithmetic processing portion 12, a data storage portion 14, an input portion 16, and an output portion 18. To the input portion 16, there are connected a relative-position detecting device 20, a vehicle speed sensor 21, a longitudinal acceleration sensor (G sensor) 22, wheel speed sensors 23, an accelerator pedal switch 27, a brake pedal switch 30, an auto-cruise control switch 32, and a setting dial 33. The vehicle speed sensor 21 is arranged to detect a running speed of the vehicle provided with the present warning apparatus. This vehicle will be referred to as "present vehicle". The longitudinal acceleration sensor 20 is arranged to detect a longitudinal acceleration of the present vehicle, namely, an acceleration value of the vehicle in its longitudinal or running direction. The wheel speed sensors 23 are arranged to detect the rotating speeds of respective wheels of the present vehicle. The accelerator pedal switch 27 is arranged to detect an operation of an accelerator pedal 26, while the brake pedal switch 30 is arranged to detect an operation of a brake pedal 29. The setting dial 33 is provided as a manually operable member (characteristic-value setting portion), which is operated by an operator or driver of the present vehicle, to set characteristic values relating to a manner of operation of the brake pedal 29 when the present vehicle is braked.

Figure 2:
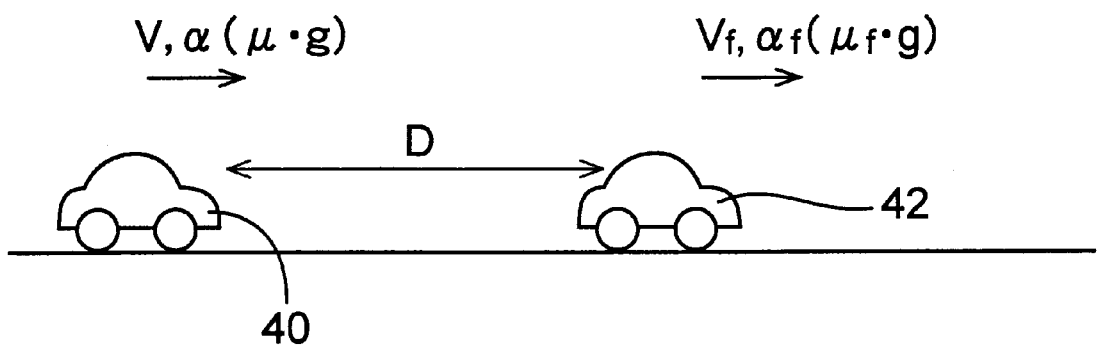
FIG. 2 is a view indicating a relative position between a present vehicle provided with the warning apparatus of FIG. 1 and a front vehicle running in front of the present vehicle.

The relative-position sensor 20 includes a millimeter wave radar and a CCD camera. The CCD camera detects an object in front of the present vehicle, and the millimeter wave radar is oriented according to the output signal of the CCD camera. The millimeter wave radar detects a distance D between the present vehicle 40 and a front vehicle 42 running in front of the present vehicle 40, as indicated in FIG. 2, and a relative speed of the two vehicles 40, 42. A running speed Vf of the front vehicle 42 is obtained on the basis of a running speed V of the present vehicle 40 and the relative speed of the two vehicles 40, 42. An acceleration value $\alpha f(\mu f \cdot g)$ of the front vehicle 42 is obtained by differentiating the running speed Vf of the front vehicle 42.

The running speed Vf, acceleration value $\alpha f(\mu f \cdot g)$, etc. of the front vehicle 42 may be obtained by the relative-position sensor 20 or by the warning control device 10.

The relative-position sensor 20 need not include both of the millimeter wave radar and the CCD camera, but may include only one of them.

The actual longitudinal acceleration of the present vehicle 40 is obtained on the basis of the output signal of the longitudinal acceleration sensor 22. A friction coefficient of a roadway surface on which the present vehicle 40 is running is obtained on the basis of the output signals of the wheel speed sensors 23.

The cruse control switch 32 is a switch which is operable by the vehicle operator and which includes at least an ON state in which a cruse control mode is selected, and an OFF state in which the cruse control mode is not selected. With the cruse control switch 32 placed in the cruse control mode, the running condition of the present vehicle 40 is controlled by an auto-cruise control device 44, on the basis of a positional relationship between the present and front vehicles 40, 42. For instance, the auto-cruse control device 44 is arranged to control a drive source (not shown) and a braking system 38 of the present vehicle 40, so as to maintain a positional relationship between the present and front vehicles 40, 42, which positional relationship is desired by the vehicle operator. The positional relationship may be represented by the vehicle-to-vehicle distance D, and a critical time D/V. Since an auto-cruise control of a vehicle is well known in the art, no detailed description thereof is deemed necessary.

The setting dial 33 is manually operated by the vehicle operator or driver, to set a plurality of relationships between characteristic values relating to the operation of the brake pedal 29. In this embodiment, the setting dial 33 has a plurality of positions having respective values (dial-position values) which are given respective values of a free running time of the specific operator of the present vehicle 40. Further, values of a critical time and values of a specific-deceleration coefficient of the specific operator are determined to correspond to the respective values of the free running time, as described below in detail. The free running time, critical time and specific-deceleration coefficient of the specific vehicle operator are used as the characteristic values relating to the operation of the brake pedal 29, which are hereinafter referred to as "brake operating characteristic values" of the specific operator relating to a braking operation by the operator to brake the vehicle 40.

The warning device 36 is activated to provide a warning signal in response to a command signal received from the warning control device 10, when the actual vehicle-to-vehicle distance D has become shorter than a warning threshold distance Dw. The warning device 36 may be adapted to generate a warning sound or voice message, turn on or flicker a warning light, provide an indication on its display portion to indicate that the distance D has become shorter than the warning threshold distance Dw, or vibrate the operator's seat.

In the present embodiment, the braking system 38 includes a brake 50 for each wheel of the present vehicle 40, a brake control actuator 52 for operating the brake 50, and an electronic brake control unit (brake ECU) 54. The braking system 38 is operable not only manually upon operation of the brake pedal 29, but also automatically. Thus, the braking system 38 is operable in an automatic braking mode, as needed. For instance, the brake 50 is a hydraulically operated brake activated by a pressurized brake fluid, but is not limited to the hydraulic brake. For example, the brake 50 may be an electrically operated brake operable by an electromagnetic force produced by an electric motor.

There will be described an operation of the present warning apparatus. During running of the present vehicle 40, the positional relationship between the present and front vehicles 40, 42 is obtained, and the warning control device 10 determines whether the obtained positional relationship falls within a warning-requirement region or a safe region. Where the positional relationship falls within the safe region, the warning device 36 is not activated to provide a warning signal or indication. The warning-requirement region is a region in which there is a comparatively high possibility that the warning signal will be provided. The warning device 36 is not activated immediately after the positional relationship has fallen within the warning-requirement region. Instead, the warning control device 10 compares the actual distance D between the present and front vehicles 40, 42 with the warning threshold distance Dw, when the positional relationship has fallen within the warning-requirement region. That is, the warning control device 10 calculates the warning threshold distance Dw, and compares the actual vehicle-to-vehicle distance D with the calculated threshold distance Dw. When the actual vehicle-to-vehicle distance D is shorter than the warning threshold distance Dw, the warning control device 10 activates the warning device 36 to generate a warning signal or provide any other suitable alarm indication. The warning-requirement region may be referred to as "warning-threshold-distance calculating region", "vehicle-to-vehicle-distance comparing region" or "pre-warning region".

In the present embodiment, the warning threshold distance Dw is determined on the basis of two relationships of the brake operating characteristic values, that is, a relationship between the free running time and the specific-deceleration coefficient, and a relationship between the free running time and the critical time, which will be described by reference to FIGS. 3 and 4.

Figure 3:
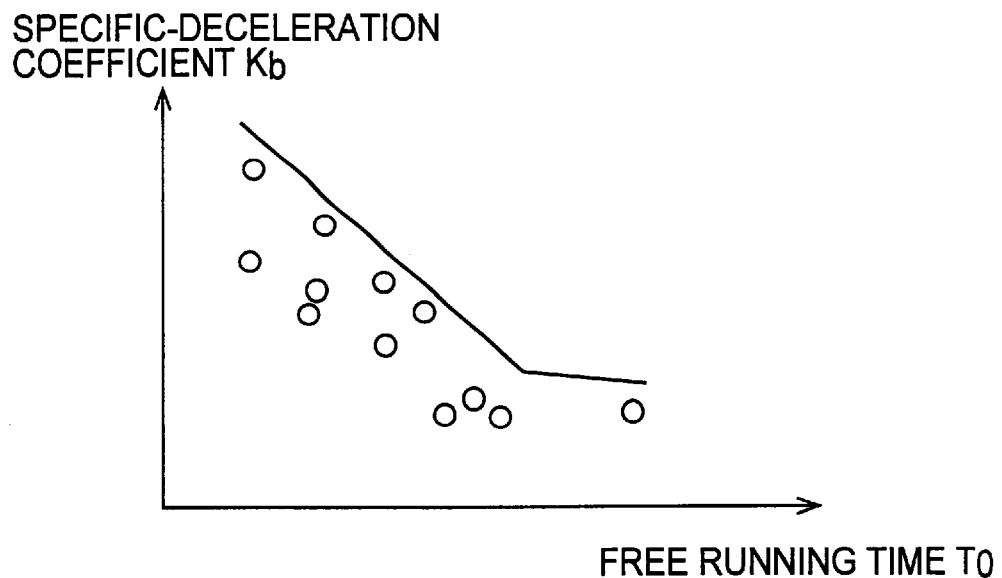
FIG. 3 is a view showing experimental data indicating a relationship between a free running time of the vehicle operated by a specific operator and a specific-deceleration coefficient of the specific operator.

The graph of FIG. 3 shows the relationship between the free running time T0 and the specific-deceleration coefficient Kb, which relationship was obtained by experimentation by the inventors of the present invention. It was found that the obtained relationship (tendency) was true for vehicle operators or drivers in general.

The free running time T0 is a time between a moment at which a specific operator of the vehicle 40 recognizes a need of braking the vehicle, and a moment at which the operator actually depresses the brake pedal 29. The moment at which the operator recognizes the need of braking the vehicle may be a moment at which the operator releases the brake pedal 26. Alternatively, the moment at which the operator recognizes the need of braking the vehicle may be a moment at which the operator recognizes that the positional relationship between the present and front vehicles 40, 42 has become a predetermined critical relationship, or a moment at which the operator has become highly tense or strained, for example, at a moment at which a surface pressure acting on the back rest of the operator's seat has suddenly increased.

The free running time T0 is determined or influenced by mental factors and locomotive capacity of the specific operator. For instance, the free running time T0 of a hasty, prompt or highly locomotive operator is generally shorter than that of a gentle, slow or poorly locomotive operator. Further, the free running time T0 of a given operator is relatively short when the operator is highly strained than when the operator is not so strained.

The specific-deceleration coefficient Kb is a ratio of the deceleration value $\alpha(\mu \cdot g)$ of the present vehicle 40 to be obtained by operation of the brake pedal 29 by the specific operator, to a maximum deceleration value $\mu_{max} \cdot g$ of the vehicle 40 that can be obtained on the specific roadway surface, which is determined by the friction coefficient of the roadway surface. The specific-deceleration coefficient Kb is represented by the following equation (1):

$$Kb=(\mu \cdot g)/(\mu_{max} \cdot g)$$

It will be understood from the above equation that the deceleration value of the present vehicle 40 increases with an in crease in the specific-deceleration coefficient Kb, where the friction coefficient of the roadway surface is constant. In other words, the deceleration value of the present vehicle 40 increases with an increase in the operating force acting on the brake pedal 29 or the operating force of the brake 50, while the operating force is not larger than a value corresponding to the maximum deceleration value.

It will also be understood that the ratio of utilization of the friction coefficient of the roadway surface increases with an increase in the specific-deceleration coefficient Kb. In this respect, the specific-deceleration coefficient Kb may be referred to as "ratio of utilization of the friction coefficient of the roadway surface". On the roadway surface having a given friction coefficient, the specific-deceleration coefficient Kb increases with an increase in the deceleration value of the vehicle 40. Although the maximum deceleration value of the vehicle 40 is relatively low when the friction coefficient of the roadway surface is relatively low, the vehicle operator generally adjusts the brake operating force so as to obtain the desired deceleration value of the vehicle 40, while preventing an increase of the brake operating force beyond a value corresponding the maximum deceleration value. Accordingly, the ratio of utilization of the friction coefficient of the roadway surface is higher when the friction coefficient is relatively low than when it is relatively high. In any case, the deceleration value of the present vehicle 40 increases and the ratio of utilization of the friction coefficient increases, as the brake operating force increases. It will therefore be understood that the vehicle operator desires a higher value of deceleration of the vehicle 40 when the specific-deceleration coefficient Kb is relatively high than when it is relatively low.

While the deceleration value of the vehicle 40 is higher when the specific-deceleration coefficient Kb is relatively high than when it is relatively low, the deceleration values of the vehicle 40 on the roadway surfaces having different friction coefficient values are different from each other even where the ratio of utilization of the friction coefficient is the same. However, the deceleration value of the present vehicle 40 can be accurately estimated on the basis of the friction coefficient of the roadway surface and the ratio of utilization of the friction coefficient.

As is apparent from the graph of FIG. 3, the relationship between the free running time T0 and the specific-deceleration coefficient Kb is such that the specific-deceleration coefficient Kb increases with a decrease in the free running time T0. Namely, the operator who has a relatively short free running time T0 has a relatively high specific-deceleration coefficient Kb, while the operator who has a relatively long free running time T0 has a relatively low specific-deceleration coefficient Kb.

The experimental data shown in FIG. 3 were processed to extract a relationship between the free running time T0 and the specific-deceleration coefficient Kb, which is used to prepare a control data map representative of a first relationship between two brake operating characteristic values in the form of the free running time T0 and the specific-deceleration coefficient Kb. This first relationship is represented by a solid line in FIG. 3, which represents a highest one of the values of the specific-deceleration coefficient Kb corresponding to each value of the free running time T0. The warning threshold distance Dw determined according to this first relationship represented by the solid line tends to be short, as described below. In this respect, it is noted that points determined by the free running time T0 and specific-deceleration coefficient Kb of most of ordinary vehicle operators are located on the left or lower side of the solid line of FIG. 3, so that the warning signal is generated only after the vehicle-to-vehicle distance D has become relatively short. This arrangement prevents frequent generation of the warning signal which is annoying to the ordinary vehicle operators. The solid line in FIG. 3 may be considered to be an envelope of the experimental data.

Figure 4:
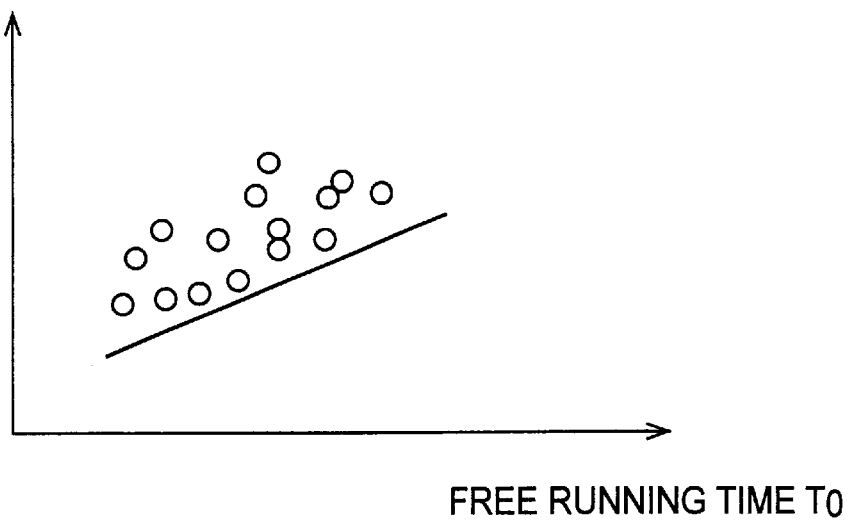
FIG. 4 is a view showing experimental data indicating a relationship between the free running time and a critical time of the specific operator.

It was found that ordinary vehicle operators had a relationship between the free running time T0 and the critical time T0', as indicated in the graph of FIG. 4. The critical time T0' is the vehicle-to-vehicle distance D divided by the running speed V of the present vehicle 40, and is represented by an equation, T0'=D/V. The vehicle-to-vehicle distance D used to obtain the critical time T0' is a distance between the present and front vehicles 40, 42 when these vehicles are running at substantially the same running speed V.

The critical time T0' may be considered to represent a positional relationship between the present and front vehicles 40, 42, as felt by the operator of the present vehicle 40. The vehicle operator generally determines whether the vehicle 40 must be braked or not, depending upon the critical time T0' with respect to the front vehicle 42. When the vehicle-to-vehicle distance D is a given value, the vehicle operator generally feels a higher need of braking the present vehicle 40 when the running speed V is relatively high than when the running speed V is relatively low. The vehicle operator depresses the brake pedal 29 when the critical time T0' has become shorter than a reference value determined by the vehicle operator. As is apparent from the graph of FIG. 4, there is a tendency that vehicle operators having a relatively short free running time T0 have a relatively short critical time T0'.

The experimental data shown in FIG. 4 were processed to extract a relationship between the free running time T0 and the critical time T0', which is used to prepare a control data map representative of a second relationship between two brake operating characteristic values in the form of the free running time T0 and the critical time T0'. This second relationship is represented by a solid line in FIG. 4, which represents a shortest one of the values of the critical time T0' corresponding to each value of the free running time T0. The warning threshold distance Dw determined according to this second relationship represented by the solid line tends to be short, as described below, so that the warning signal is generated only after the vehicle-to-vehicle distance D has become relatively short. This arrangement prevents frequent generation of the warning signal which is annoying to the ordinary vehicle operators.

Figure 5:
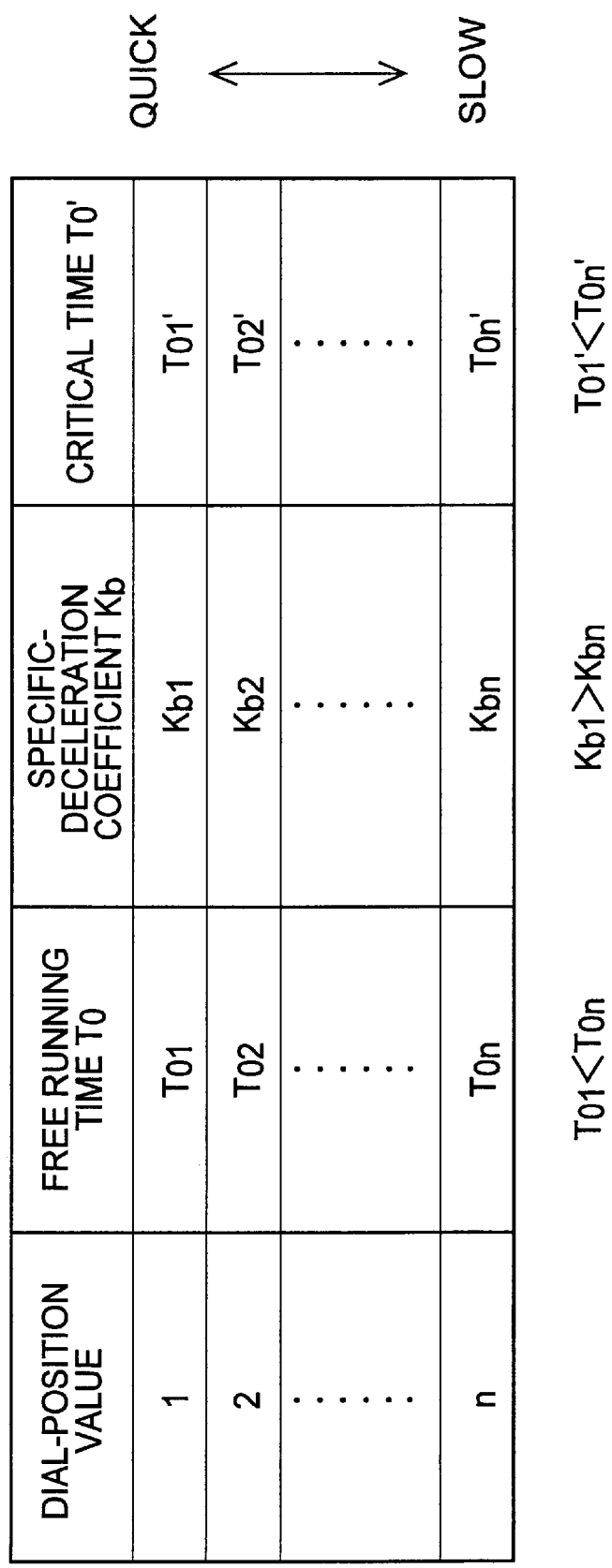
FIG. 5 is a view showing a data map which indicates characteristic-value relationships and which is stored in a data storage portion of a warning control device of the warning apparatus of FIG. 1.
Figure 6:
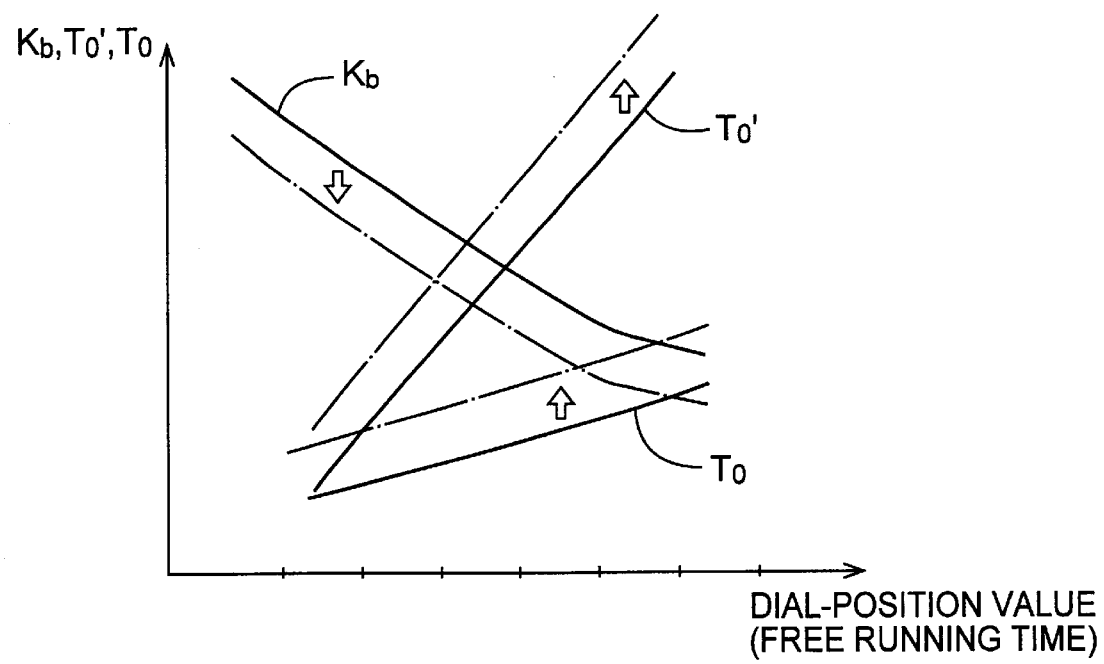
FIG. 6 is a view schematically showing the characteristic-value relationships of FIG. 5.
Figure 7:
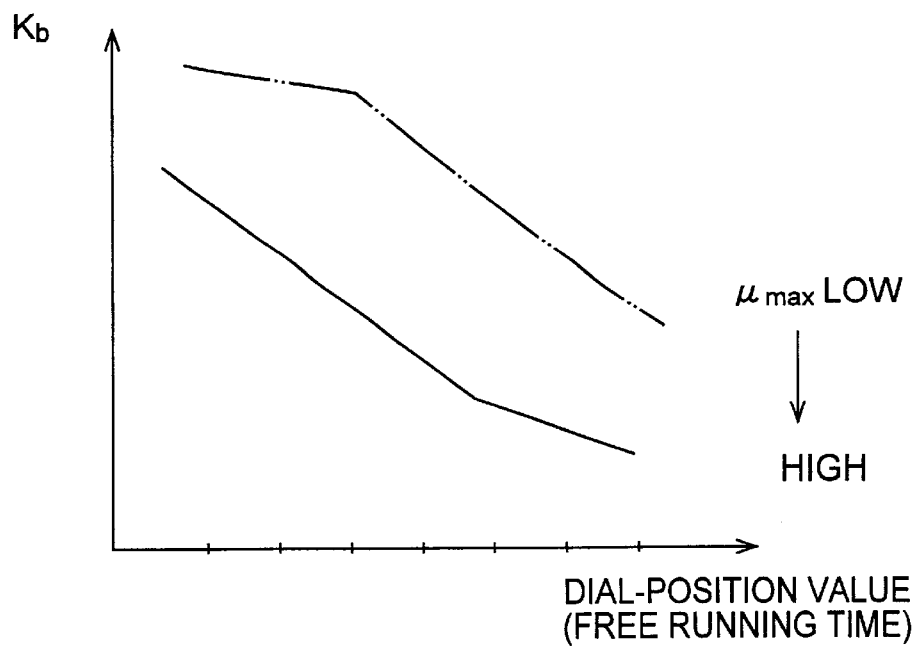
FIG. 7 is a view schematically showing the characteristic-value relationships of FIG. 5.

In the present embodiment, a control data map representative of a data table indicated in FIG. 5 is prepared according to the first and second brake operating characteristic-value relationships represented by the respective solid lines in FIGS. 3 and 4. This control data map is stored in the data storage portion 14 of the warning control device 10. When the setting dial 33 is operated by the vehicle operator to a selected one of the dial-position value, the specific-deceleration coefficient Kb and the critical time T0' are determined for the free running time T0 which corresponds to the selected dial-position value. As indicated by solid lines in FIG. 6, the free running time T0 increases with an increase of the dial-position value. Further, as the free running time T0 increases, the specific-deceleration coefficient Kb decreases while the critical time T0' increases.

The brake operating characteristic-value relationships indicated above are not kept constant, but are changed to increase the warning threshold distance Dw while the vehicle is running in the auto-cruise control mode. As indicated by one-dot chain lines in FIG. 6, the relationships are changed so as to increase the free running time T0 and the critical time T0' and reduce the specific-deceleration coefficient Kb. In the auto-cruise control mode, the vehicle operators tend to be relaxed, so that the warning threshold distance Dw is increased to generate the warning signal at a relatively early point of time.

It is not essential to change all of the free running time T0, critical time T0' and specific-deceleration coefficient Kb when the auto-cruise control mode is selected. Only one or two of these parameters may be changed when the auto-cruise control mode is selected. The amount of change of the parameters T0, T0', Kb need not be kept constant throughout the auto- control mode, but may be changed depending upon the cumulative running time of the vehicle in the auto-cruise control mode. Since the vehicle operators tend to be more and more relaxed with an increase of the cumulative running time in the auto-control mode, the warning threshold distance Dw is increased as the cumulative running time increases.

Further, the specific-deceleration coefficient Kb is made higher when the friction coefficient of the roadway surface is relatively low than when the friction coefficient is relatively high. The friction coefficient of the roadway surface is usually determined on the basis of the output signal of the wheel speed sensors 23. For improving the accuracy of determination of the friction coefficient, the braking pressure applied to the brake 50 is intermittently raised to a level higher than a predetermined value, by controlling the brake control actuator 52, and changes of the wheel speeds are detected. The friction coefficient of the roadway surface is determined on the basis of the detected changes of the wheel speeds. Thus, the friction coefficient $\mu_{max}$ is determined, and the warning threshold distance Dw is determined on the basis of the determined friction coefficient $\mu_{max}$.

Figure 8:
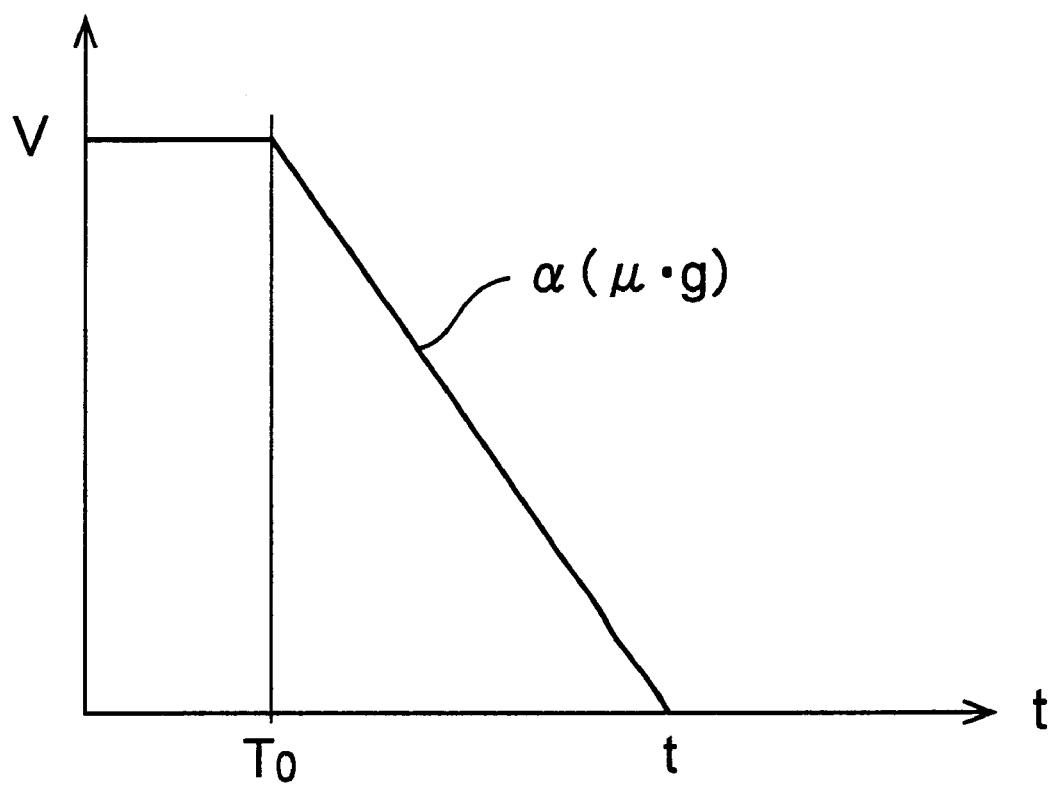
FIG. 8 is a view showing a relative position between the present and front vehicles and a warning threshold distance in one case of generation of a warning signal by the warning apparatus of FIG. 1.
Figure 9:
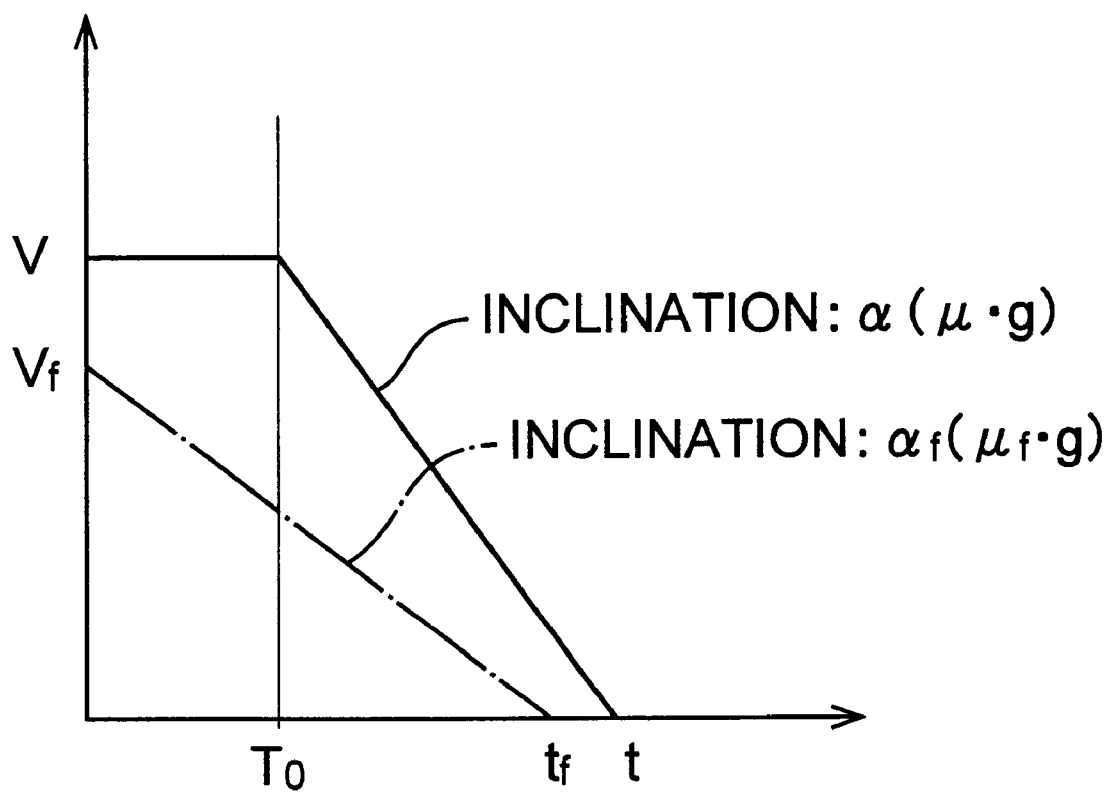
FIG. 9 is a view showing the relative position between the present and front vehicles and the warning threshold distance, in another case of generation of the warning signal by the warning apparatus of FIG. 1.

A manner of determination of the warning threshold distance D2 will be described. The graph of FIG. 8 shows a state in which the front vehicle 42 is stationary. In this case, an object in front of the present vehicle 40 is not a moving object. When the absolute value of the running speed Vf of the front vehicle 42 is smaller than a predetermined value Vfs, that is, when an inequality |Vf|<Vfs is satisfied, the positional relationship between the vehicles 40, 42 is determined to fall within the warning-requirement region. In this case, the actual vehicle-to-vehicle distance D is compared with the warning threshold distance Dw.

The warning threshold distance Dw is obtained as a running distance of the present vehicle 40 required to stop the vehicle. The time "t" required to stop the present vehicle 40 is represented by the following equation, as is understood from the graph of FIG. 8:

$$t=T0+V/(\mu \cdot g)$$

Accordingly, the running distance Dw of the present vehicle 40 required to stop it is calculated according to the following equation (1), on the basis of the running speed V, a specific deceleration value ($\mu \cdot g$) and the time "t":

$$Dw=VT0+V(t-T0)-(\mu \cdot g/2)(t-T0)^2+d0$$

$$=VT0+(V^2/2\mu \cdot g)+d0 \quad (1)$$

wherein "d0" represents an extra vehicle stopping time.

When the warning threshold distance Dw is obtained in this case, the free running time T0 is represented by the dial-position value of the setting dial 33 set by the operator, and the specific deceleration value ($\mu \cdot g$) is obtained by multiplying the maximum deceleration value $\mu_{mas}$ (determined by the friction coefficient of the roadway surface) by the specific-declaration coefficient Kb, that is, calculated according to the following equation (1):

$$(\mu \cdot g)=(\mu_{max} \cdot g)Kb$$

Thus, the warning threshold distance Dw is determined on the basis of the free running time T0 set by the vehicle operator, and the specific-deceleration coefficient Kb which is estimated by the free running time T0 and according to the predetermined relationship between the time T0 and the coefficient Kb. This arrangement permits the warning device 36 to be activated to generate the warning signal at a timing that suits the particular brake operating characteristic or habit of the specific operator of the present vehicle 40. The determination as to whether the warning signal should be generated or not is effected on the basis of a difference $d_{min}$ which is obtained according to the following equation (2):

$$d_{min}=D-Dw \quad (2)$$

Suppose the front vehicle 42 under deceleration is stopped before the present vehicle 40. For the front vehicle 42 to be brought into a stop before the present vehicle 40, a time "tf" required to stop the front vehicle 42 must be equal to or shorter than the time "t" required to stop the present vehicle 40. The positional relationship between the two vehicles 40, 42 is determined to fall within the warning-requirement region, when the following equations line qualities (3) are satisfied:

$$tf \leq t$$

$$(Vf/\mu f \cdot g) \leq T0+(V/\mu \cdot g) \quad (3)$$

The warning threshold distance Dw is the running distance of the present vehicle 40 required to be stopped, minus the running distance of the front vehicle 42 required to be stopped, and is obtained according to the following equation (4):

$$Dw=VT0+V(t-T0)-(\mu \cdot g/2)(t-T0)^2-\{Vf \cdot tf-(\mu f \cdot g/2) \cdot tf^2\}+d0$$

$$=VT0+(V^2/2\mu \cdot g)-(Vf^2/2\mu f \cdot g)+d0 \quad (4)$$

Figure 10:
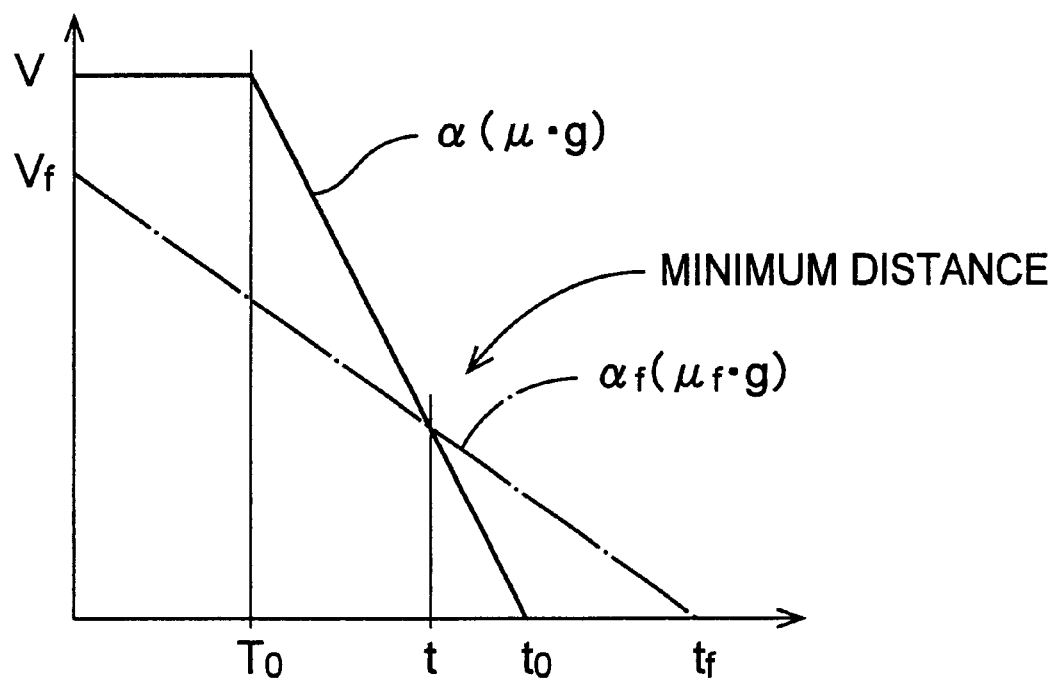
FIG. 10 is a view showing the relative position between the present and front vehicles and the warning threshold distance, in a further case of generation of the warning signal by the warning apparatus of FIG. 1.

Suppose the present vehicle 40 is stopped before the front vehicle 42 under deceleration and the minimum distance D between the two vehicles 40, 42 takes place at a point of time "t" as indicated in the graph of FIG. 10. Before the point of time "t", the running speed V of the present vehicle 40 is higher than the running speed Vf of the front vehicle 42, so that the present vehicle 40 approaches the front vehicle 42. After the point of time "t", the running speed V of the present vehicle 40 is lower than the running speed Vf of the front vehicle 42, the vehicle-to-vehicle distance D increases. Therefore, the distance D is smallest at the point of time "t".

As indicated in FIG. 10, the warning-requirement region is a region which satisfies two conditions, that is, a condition that the present vehicle 40 is stopped before the front vehicle 42, and a condition that the running speed Vf of the front vehicle 42 is lower than the running speed V of the present vehicle 40 upon expiration of the free running time T0. Therefore, the positional relationship between the two vehicles 40, 42 falls within the warning-requirement region when the following inequalities (5) and (6) are satisfied:

$$Vf>g \cdot \mu f(T0+V/\mu \cdot g) \quad (5)$$

$$Vf<g \cdot \mu f \cdot T0+V \quad (6)$$

At the point of time "t" at which the vehicle-to-vehicle distance D is smallest, the running speed V of the present vehicle 40 is equal to the running speed Vf of the front vehicle 42 (V=Vf). Therefore, the point of time "t" can be obtained according to the following equation (7), and the running speed Vs of the present vehicle 40 at the point of time "t" (which speed Vs is equal to the running speed Vf of the front vehicle 42) is obtained according to the following equation (8):

$$t=(Vf-V-\mu \cdot g \cdot T0)/\{g \cdot (\mu f-\mu)\} \quad (7)$$

$$Vs=(\mu f \cdot V-\mu \cdot Vf+\mu \cdot \mu f \cdot g \cdot T0)/(\mu f-\mu) \quad (8)$$

The warning threshold distance Dw in the above case is equal to a difference between the running distance of the two vehicles 40, 42 up to the point of time "t", plus a product (Vs·T0') of the running speed of the vehicle 40 at the point of time "t" and the critical time T0'. Namely, the warning threshold distance Dw is obtained according to the following equation (9):

$$Dw=Vs \cdot T0'-\mu \cdot g \cdot T0^2/2$$

$$-(Vf-V-\mu \cdot g \cdot T0)^2/\{2 \cdot g \cdot (\mu f-\mu)\}+d0 \quad (9)$$

It will be understood from the above equation (9) that the warning threshold distance Dw is longer when the critical time T0' is relatively long than when the critical time T0' is relatively short. As described above, the critical time T0' corresponds to the dial-position value (free running time T0) of the setting dial 33 set by the vehicle operator, and increases with an increase of the free running time T0.

Further, an adjusted warning threshold distance DwA is obtained. This adjusted warning threshold distance DwA is a distance determined by taking account of an error of detection of the positional relationship between the two vehicles 40, 42, and is obtained according to one of the following equations (10A), (10B), (12A), (12B) and (14). The distance DwA is obtained according to the equation (10A) or (10B) when the following equation (11) is satisfied. The distance DwA is obtained according to the equation (12A) or (12B) when the following equation (13) is satisfied. The distance DwA is obtained according to the equation (14) when the following equation (15) is obtained. The equation (10B) is used in the case where the deceleration value ($\mu f \cdot g$) of the front vehicle 42 is zero, and the equation (10A) is used in the other cases. The same is true for the equations (12A) and (12B):

$$DwA = \{\mu \cdot (V + \mu \cdot g \cdot U) - \mu f \cdot Vf + (Vf - V - \mu \cdot g \cdot U)\mu_{max}\}^2 / \quad (10A)$$
$$\{2 \cdot g \cdot (\mu - \mu f)(\mu_{max} - \mu - \mu f)\} +$$
$$\{(V + \mu \cdot g \cdot U)^2 - Vf^2\}/(2\mu_{max} \cdot g) - (\mu \cdot g \cdot U^2)/2 + d0 + Tb' \cdot V$$

$$DwA = \{Vf \cdot \mu_{max} - (V + \mu \cdot g \cdot U) \cdot (\mu_{max} - \mu)\}^2 / \quad (10B)$$
$$\{2 \cdot g \cdot \mu \cdot (\mu_{max} - \mu)\} +$$
$$\{(V + \mu \cdot g \cdot U)^2 - Vf^2\}/(2\mu_{max} \cdot g) -$$
$$(\mu \cdot g \cdot U^2)/2 + d0 + Tb' \cdot V$$

$\mu + \mu f + \Delta\mu \leq \mu_{max}$, and $(V - Tb' \cdot \mu \cdot g)(\mu_{max} - \mu) > (Vf - \mu f \cdot g \cdot T0)(\mu_{max} - \mu f)$ (11)

$DwA = (V - Vf) \cdot T0 + \mu f \cdot g \cdot T0^2/2$
$+ \{V^2 - (Vf - \mu f \cdot g \cdot T0)^2\}/(2\mu_{max} \cdot g) + d0 + Tb' \cdot V$ (12A)

$DwA = (V - Vf) \cdot T0 + (V^2 - Vf^2)/(2\mu_{max} \cdot g) + d0 + Tb' \cdot V$ (12B)

$\mu + \mu f + \Delta\mu \leq \mu_{max}$, and $(V - Tb' \cdot \mu \cdot g)(\mu_{max} - \mu) \leq (Vf - \mu f \cdot g \cdot T0)(\mu_{max} - \mu f)$ or $\mu_{max} \leq \mu + \mu f - \Delta\mu$ (13)

$$DwA = (V - Vf) \cdot T0 + \mu \cdot g \cdot (T0^2 - Tb'^2)/2 + \quad (14)$$
$$d0 + Tb' \cdot V - [Vf^2 - (V + \mu \cdot g \cdot U)^2 +$$
$$2g \cdot T0 \cdot \{\mu(V + \mu \cdot g \cdot U) - \mu f \cdot Vf\}]/2\mu_{max} \cdot g)$$

$\mu + \mu f - \Delta\mu < \mu_{max} < \mu + \mu f + \Delta\mu$ (15)

In the above equations, "U" represents a time (T0–Tb'), that is, the free running time T0 minus a predetermined time Tb' (<T01'), and "$\Delta\mu$" represents a LSB value (provisional value) of the friction coefficient of the roadway surface $\mu$.

In the present case, the determination as to whether the warning device 36 should be activated to generate the warning signal is not made by comparing the vehicle-to-vehicle distance D directly with the warning threshold distance Dw, but is made by determining whether a value $d_{min} = MIN(d_{min1}, d_{minA})$ is smaller than zero. Namely, the warning signal is generated when the value $d_{min}$ is smaller than zero. The value $d_{min}$ is a smaller one of a difference $d_{min1}$ (=D–Dw) between the vehicle-to-vehicle distance D and the warning threshold value Dw, and an adjusted difference $d_{minA}$ (D–DwA) between the distance D and the adjusted warning threshold distance DwA.

In the above arrangement wherein the determination is based on the smaller one of the values dmin1 and $d_{minA}$, the warning signal is generated when the vehicle-to-vehicle distance D minus a larger one of the warning threshold distance Dw and the adjusted warning threshold distance DwA is smaller than zero. In this respect, the larger one of the distances Dw and DwA may be referred to as an "effective warning threshold distance"

Figure 11:
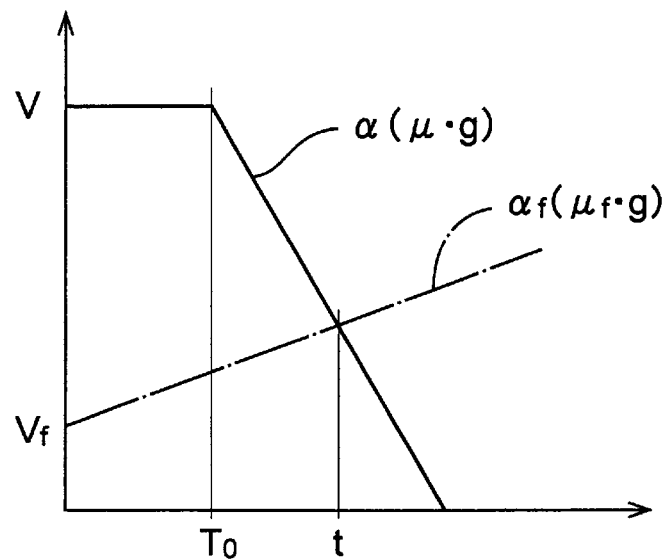
FIG. 11 is a view showing the relative position between the present and front vehicles and the warning threshold distance, in a still further case of generation of the warning signal by the warning apparatus of FIG. 1.

The foregoing description in the case of FIG. 10 applies to a case of FIG. 11 where the present vehicle 40 approaches the front vehicle 42, in a accelerating acceleration of the front vehicle 42 and in a decelerating state of the present vehicle 40 is in a decelerating state.

Figure 12:
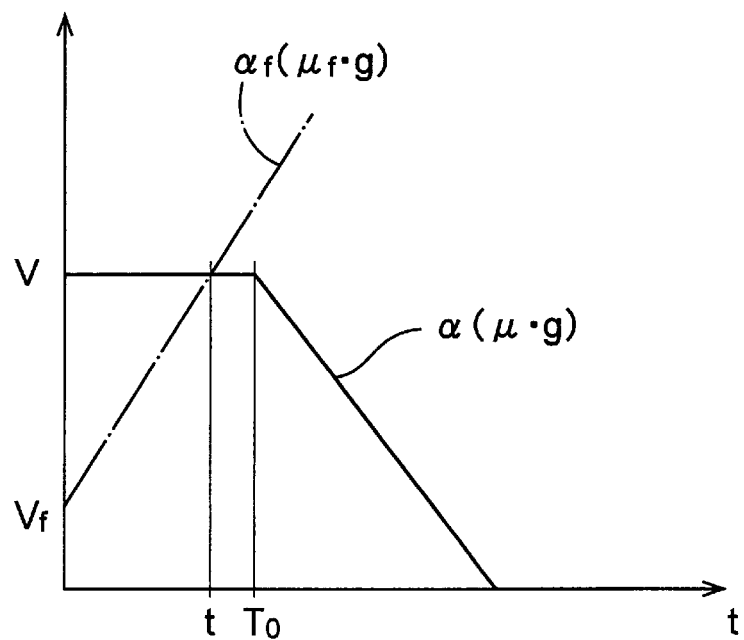
FIG. 12 is a view showing the relative position between the present and front vehicles and the warning threshold distance, in a yet further case of generation of the warning signal by the warning apparatus of FIG. 1.

Reference is now made to a case of FIG. 12 where the present vehicle 40 approaches the front vehicle 42 in an accelerating state of the front vehicle 42 and in a free running of the present vehicle 40. In this case, the running speed Vf of the front vehicle 42 is lower than the running speed V of the present vehicle 40 before the point of time "t", and is higher than the running speed V upon expiration of the free running time T0. Accordingly, the positional relationship between the two vehicles 40, 42 is determined to fall within the warning-requirement region, when the following equation (16) is satisfied:

$Vf \geq \mu f \cdot g \cdot T0 + V$ $V > Vf$ (16)

The warning threshold distance Dw is a difference between the running distances of the front vehicle 40 and the present vehicle 42 up to the point of time "t" (at which the minimum distance takes place), plus a product (T0'·V) of the critical time T0' and the running speed Vs at the point of time "t". In the case of FIG. 12 in which the minimum distance takes place in the free running state of the prevent vehicle 40, the running speed V at the point of time "t" is equal to the running speed V. According the warning threshold distance Dw is obtained according to the following equation (17):

$Dw = v \cdot T0' - (V - Vf)^2/(2 \cdot g \cdot \mu f) + d0$ (17)

An adjusted warning threshold distance DwB is obtained according to the following equation (18) when the following equation (19) is satisfied, and according to the following equation (20) when the following equation (21) is satisfied:

$DwB = (V^2 - Vf^2)/(2\mu_{max} \cdot g) + d0 + Tb' \cdot V$ (18)

$V \leq (1 - \mu f/\mu_{max})Vf$ (19)

$DwB = (V^2 - Vf^2)/(2\mu_{max} \cdot g) + d0 + Tb' \cdot V$
$-\{\mu_{max}(Vf - V) - \mu f \cdot Vf\}^2/\{2\mu_{max} \cdot f \cdot (\mu_{max} - \mu f) \cdot g\}$ (20)

$V > (1 - \mu f/\mu_{max})Vf$ (21)

In this case, too, the determination as to whether the warning signal should be generated is made by determining whether a value $d_{min}=MIN(d_{min1}, d_{minB})$ is smaller than zero. Namely, the warning signal is generated when the value dmin is smaller than zero. The value $d_{min}$ is a smaller one of the difference $d_{min1}$ (=D−Dw) between the vehicle-to-vehicle distance D and the warning threshold value Dw, and an adjusted difference $d_{minB}$ (D−DwB) between the distance D and the adjusted warning threshold distance DwB.

Figure 13:
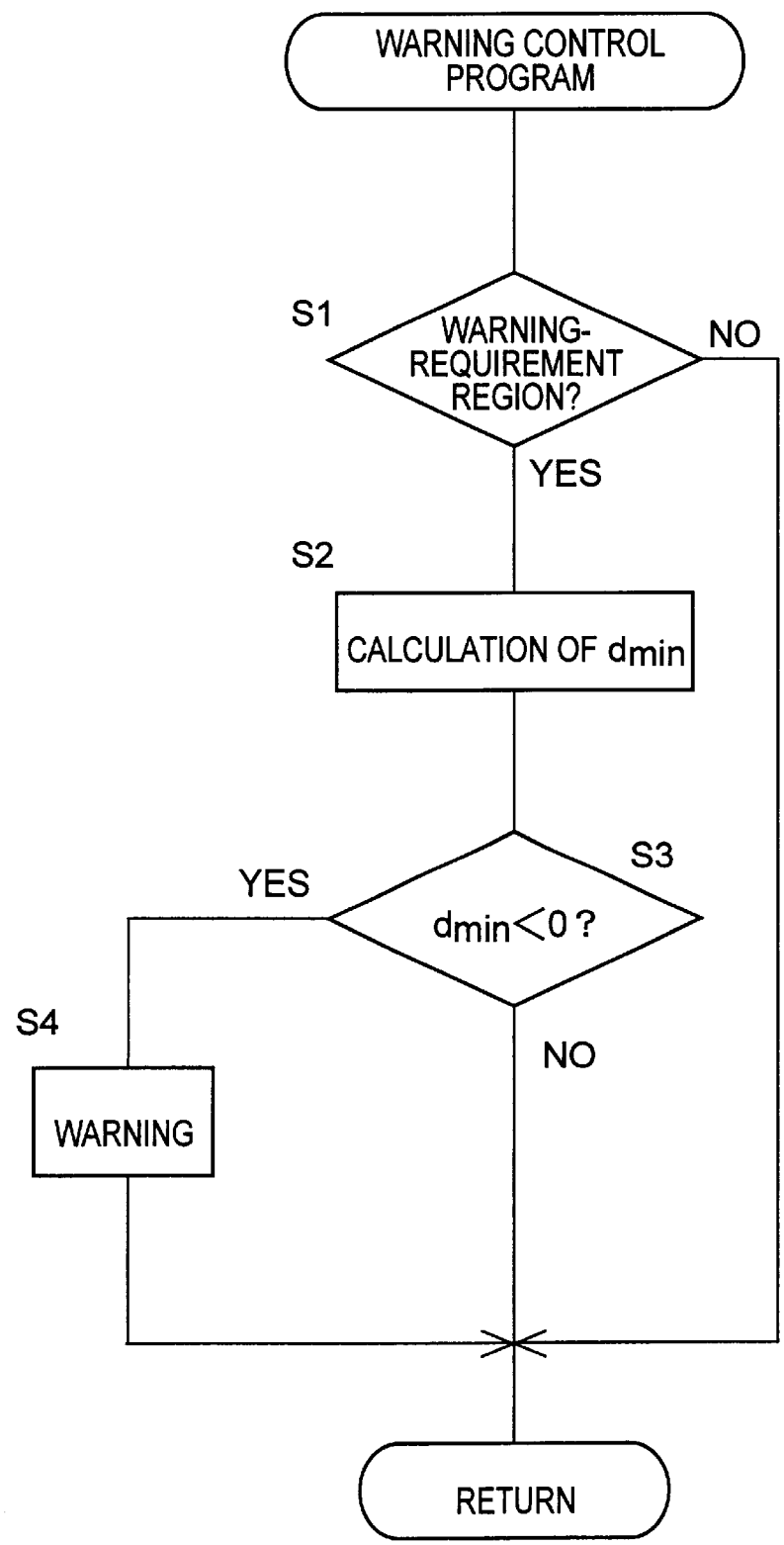
FIG. 13 is a flow chart illustrating a warning control program stored in the data storage portion of the warning control device.

There will next be described a manner of controlling the warning device 36, referring to the flow chart of FIG. 13 illustrating a warning control program, which is repeatedly executed with a predetermined cycle time.

The warning control program is initiated with step S1 to read the running speed V of the present vehicle 40 and the running speed Vf and acceleration value $\mu f \cdot g$, and determine whether the positional relationship of the present and front vehicles 40, 42 falls within the warning-requirement region or safe region, according to the appropriate inequalities/equations described above. If the positional relationship falls within the warning-requirement region, the control flow goes to step S2 read the value $d_{min}$, and to step S3 to determine whether the value $d_{min}$ is smaller than zero, that is, whether the actual vehicle-to-vehicle distance D is shorter than the warning threshold distance D2. If the value $d_{min}$ is equal to or larger than zero, the warning device 36 is not activated even while the positional relationship lies within the warning-requirement region. If the value di is smaller than zero, step S4 is implemented to activate the warning device 36 to generate the warning signal.

A manner of obtaining the value $d_{min}$ in step S2 will be described. In the present embodiment, the warning threshold distance Dw is obtained on the basis of the free running time T0, critical time T0' and specific-deceleration coefficient Kb, which correspond to the dial-position value of the setting dial 33. The free running time T0, critical time T0' and specific-deceleration coefficient Kb are made longer or higher when the auto-control mode is selected. Further, the specific-deceleration coefficient Kb is changed with a change of the friction coefficient $\mu_{max}$ of the roadway surface.

Figure 14:
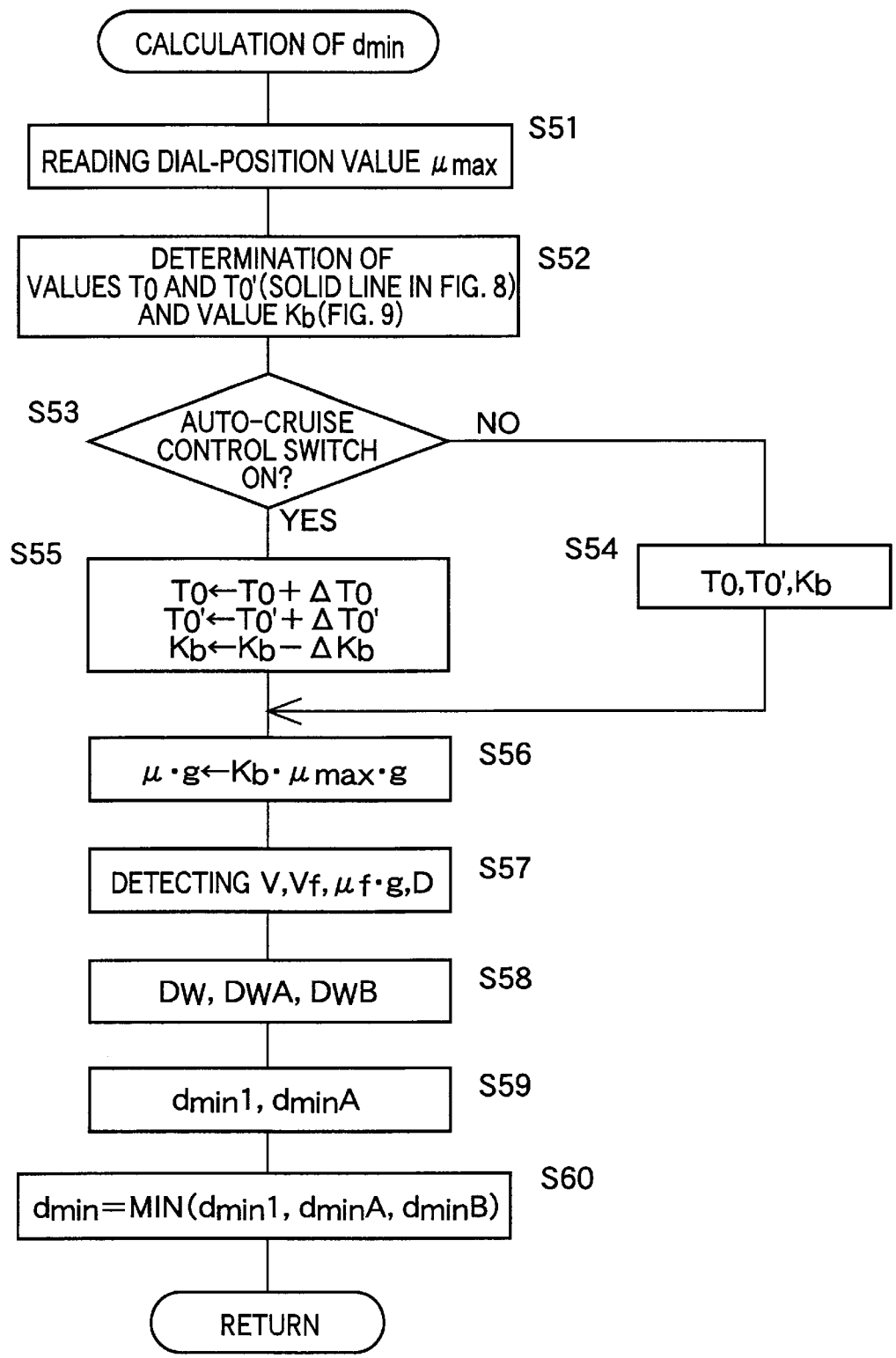
FIG. 14 is a flow chart illustrating a portion of a the warning control program of FIG. 13.

Referring to the flow chart of FIG. 14, the dial-position value of the setting dial 33, the friction coefficient limax of the roadway surface are read in step S51, and the free running time T0, critical time T0' and specific-deceleration coefficient Kb are determined in step S52 on the basis of the dial-position value and according to the data map of FIG. 5. Step S53 is then implemented to determine whether the auto-control switch 32 is in the ON state. If the auto-control switch 32 is in the OFF state, the control flow goes to step S54 to use the values T0, T0' and Kb as determined according to the data map of FIG. 5. If the auto-control switch 32 is in the ON state, the control flow goes to step S55 to change the determined values T0, T0' and Kb by predetermined amounts as indicated in one-dot chain lines in FIG. 6, for increasing the warning threshold distance Dw. More specifically described, the free running time T0 and critical time T0' are increased, while the specific-deceleration coefficient Kb is reduced.

Then, step S55 is implemented to estimate the deceleration value of the present vehicle 40 on the basis of the specific-deceleration coefficient Kb and the friction coefficient gmax of the roadway surface. Since the estimation is effected on the basis of the friction coefficient of the roadway surface and the specific-deceleration coefficient Kb which reflects the ratio of utilization of the friction force between the roadway surface and the braked wheels, the accuracy of the estimation can be improved. Step S57 is then implemented to read the running speed V of the present vehicle 40, running speed Vf and the deceleration value $\mu f \cdot g$ of the front vehicle 42, and vehicle-to-vehicle distance D. Step S57 is followed by step S58 to obtain the warning threshold distance Dw, and adjusted warning threshold distances DwA, DwB. Then, the control flow goes to step S59 to obtain the values $d_{min1}$, $d_{minA}$ and $d_{minB}$, by subtracting the warning threshold distance Dw1 and the adjusted warning threshold distances DwA, DwB from the actual vehicle-to-vehicle distance D, respectively. Step S60 is then implemented to determine a smallest one of the values $d_{min1}$, $d_{minA}$ and $d_{minB}$, as the value $d_{min}$ used to determine whether the warning signal should be generated.

As described above, the warning threshold distance Dw is determined on the basis of the critical time T0' and specific-deceleration coefficient Kb, which are used as estimated braking-state quantities (brake operating characteristic values) that are estimated on the basis of the free running time T0 set by the vehicle operator by the setting dial 33, and the data map of FIG. 5 representative of the relationships between the critical time T0 and the brake operating characteristic values. Accordingly, the warning signal can be generated at a timing that suits the specific brake operating characteristic or habit. Since the warning threshold distance Dw is made shorter when the dial-position value is relatively small than when the dial-position value is relatively large, there is a less possibility of generation of the warning signal when the dial-position value is relatively small than when it is relatively large, provided that the vehicle-to-vehicle distance D is constant. For instance, a hasty, prompt or highly locomotive vehicle operator or a vehicle operator who likes a sporty driving of the vehicle 40 sets the setting dial 33 to a relatively small dial-position value. In this case, the frequency of generation of the warning signal which is annoying to such vehicle operator is reduced. Further, the same vehicle operator may set the setting dial 33 to different dial-position values depending upon the metal state of the vehicle operator during running of the vehicle. This setting permits the generation of the warning signal at a timing that suits the specific metal state of the operator. Where a vehicle operator feels a shortage of sleep and tends to be careless during driving of the vehicle, the vehicle operator may increase the dial-position of the setting dial 33. In this case, the generation of the warning signal is not felt uncomfortable to the vehicle operator.

Further, since the warning threshold distance Dw is made longer during running of the vehicle 40 in the auto-control mode, so that the warning signal is generated at a comparatively early point of time. This arrangement is effective to prevent reduction of the operating safety in the auto-control mode in which the vehicle operator tends to be relatively relaxed. In addition, the determination of the specific deceleration value ($\mu \cdot g$) on the basis of the friction coefficient of the roadway surface and the ratio of utilization of the friction force between the roadway surface and the vehicle wheels improves the accuracy of estimation of the deceleration value of the present vehicle 40.

In the present embodiment described above, the data storage portion 14 constitutes a characteristic-value storage portion which stores the brake operating characteristic values, and a portion of the warning control device 10 assigned to implement step S3 of the flow chart of FIG. 13 constitutes a major part of a threshold-value determining portion operable to determine a threshold distance Dw. Further, the data storage portion 14 storing the data map of FIG. 5 and a portion of the warning control device 10 assigned to implement steps S54 and S55 of the flow chart of FIG. 14 constitute a characteristic-value-relationship determining portion operable to determine relationships between the brake operating characteristic values. The wheel speed sensors 23 and the brake control actuator 52 constitutes a friction-coefficient obtaining portion operable to obtain the friction coefficient of the roadway surface. The characteristic-value-relationship determining portion determines the relationships on the basis of the obtained friction coefficient.

Figure 15:
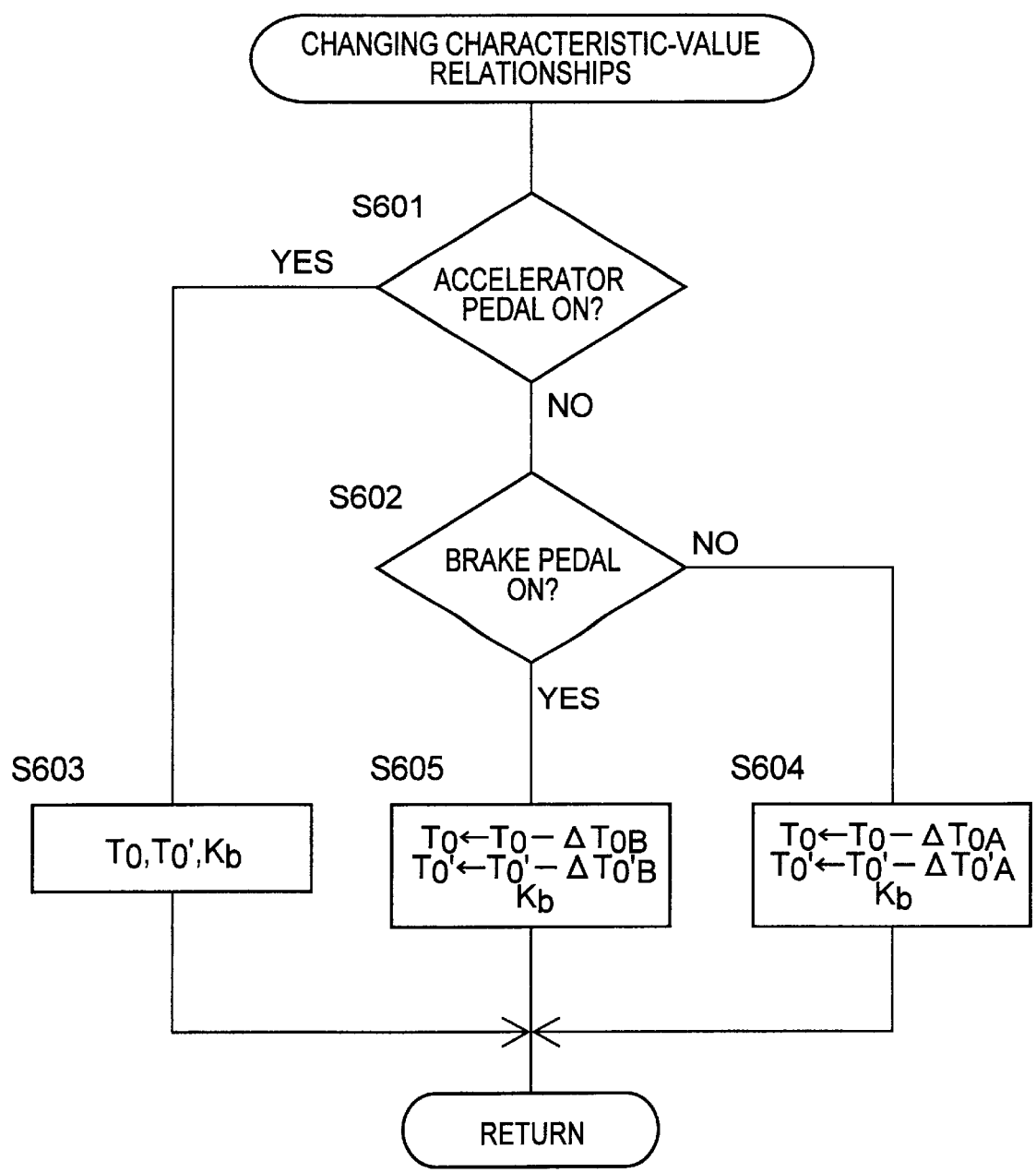
FIG. 15 is a flow chart illustrating a characteristic-value relationship changing program stored in a data storage portion of a warning control device of a warning apparatus according to another embodiment of this invention.

The relationships among the brake operating characteristic values may be changed on the basis of the running condition of the present vehicle 40, that is, the operating states of the accelerator pedal 26 and brake pedal 29 by the vehicle operator. The flow chart of FIG. 15 illustrates a program for changing the characteristic-value relationships. The program is initiated with steps S601 and S602 to determine whether the accelerator pedal 26 and the brake pedal 29 are placed in the operated positions.

While the accelerator pedal 26 is in operation, the control flow goes to step S603 to determine the free running time T0, critical time T0' and specific-deceleration coefficient Kb on the basis of the dial-position value of the setting dial 33 and according to the data map of FIG. 5. If neither the accelerator pedal 26 nor the brake pedal 29 is placed in the operated position, the control flow goes to step S604 to reduce the free running time T0 and the critical time T0' as determined according to the data map of FIG. 5, by respective predetermined amounts $\Delta T0A$ and $\Delta T0'A$. While the brake pedal 29 is in the operated position, the control flow goes to step S605 to reduce the free running time T0 and the critical time T0' by respective predetermined amounts $\Delta T0B$ and $\Delta T0'B$, which are larger than the predetermined amounts $\Delta T0A$ and $\Delta T0'A$. The free running time T0 and the critical time T0' may be made comparatively short during an operation of the brake pedal 29.

Although the first embodiment is arranged to determine the free running time T0 and critical time T0' depending upon the dial-position value set on the setting dial 33, a predetermined constant free running time T0 and a predetermined constant critical time T0' may be used. For instance, the free running and critical times T0, T0' may be zero. Further, it is not essential to change both of the free running and critical times T0, T0' depending upon whether the accelerator pedal 26 and brake pedal 29 are in operation or not, but it is possible to change only one of the times T0, T0'.

Further, the free running time T0 may be detected during running of the vehicle. In this case, the vehicle operator is not required to manipulate the setting dial 33 to set the free running time T0. In this modified embodiment of the invention, the free running time T0 may be a minimum time duration between a moment at which the accelerator pedal 26 is released, and a moment at which the brake pedal 29 is depressed. This time duration represents the locomotive capacity of the vehicle operator. Namely, the time which has passed after the accelerator pedal 26 is released is measured. The moment at which the accelerator pedal 26 is released is considered to be a moment at which the vehicle operator feels it necessary to apply a brake to the present vehicle 40.

Figure 16:
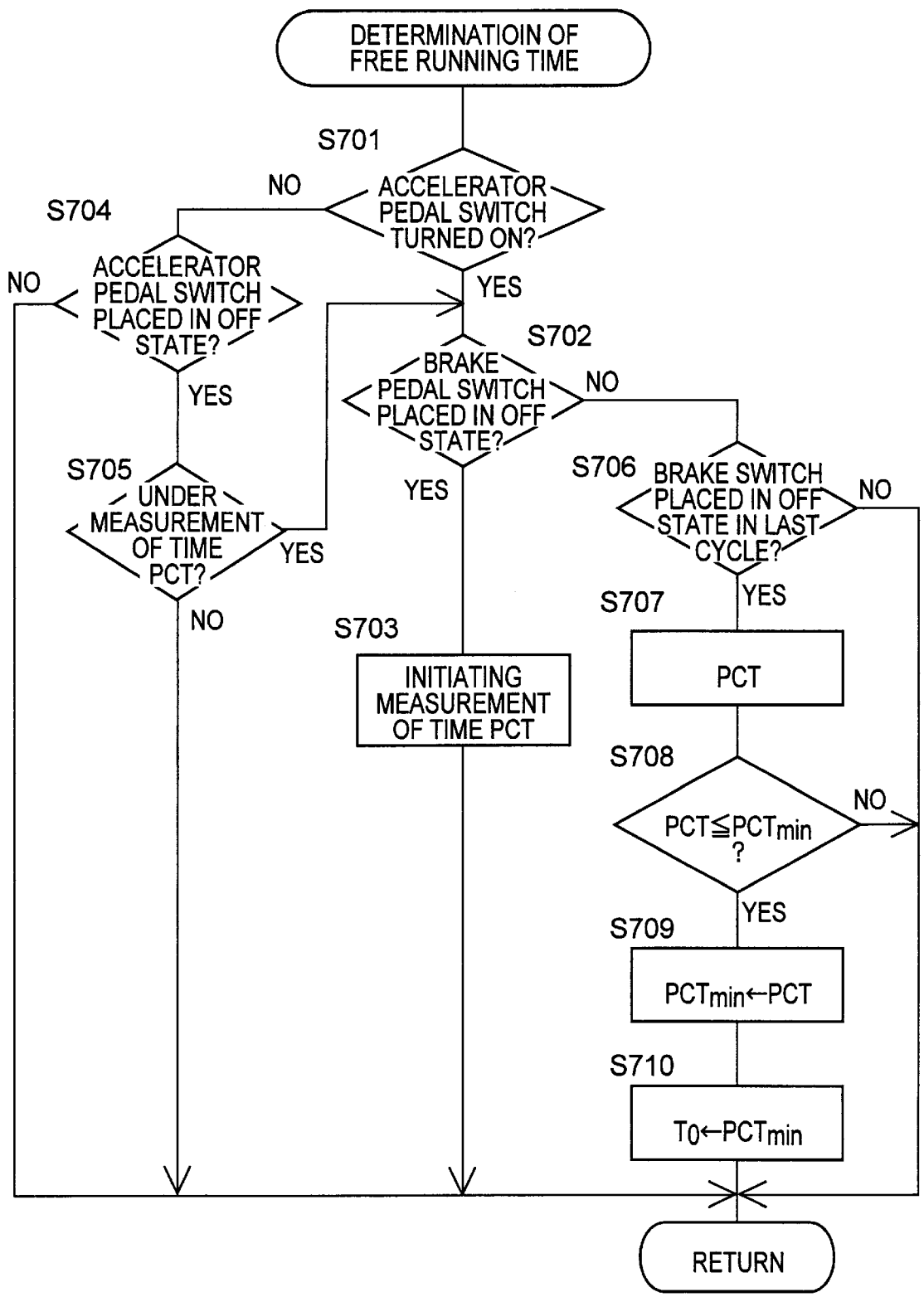
FIG. 16 is a flow chart illustrating a free running time determining program stored in a data storage portion of a warning control device of a warning apparatus according to a further embodiment of the invention.

There will be described a manner of determining the free running time T0, by reference to the flow chart of FIG. 16 illustrating a free running time determining program. This program is initiated with step S701 to determine whether the operating state of the accelerator pedal switch 27 has been changed from the OFF state to the ON state. Step S701 is followed by step S702 to determine whether the brake pedal switch 30 is placed in the OFF state. If the accelerator pedal switch 27 is turned OFF while the brake pedal switch 27 is in the ON state, the control flow goes to step S703 to initiate a measurement of a time PCT which has passed after the accelerator pedal switch 27 is turned OFF. The measurement of the time PCT is continued while the accelerator pedal switch 27 and the brake pedal switch 30 are both held in the OFF state. That is, if it is determined in step S704 that the accelerator pedal switch 27 is in the OFF state, the control flow goes to step S705 to determine whether the time measurement is effected by a timer. If an affirmative decision (YES) is obtained in step S705, the control flow goes to steps S703 and S704 to continue the measurement of the time PCT. If it is not determined in step S704 that the time measurement is not effected by the timer, it indicates that the accelerator pedal switch 27 has not been turned from the ON state to the OFF state, but is held in the OFF state. In this case, the time measurement is not effected in step S703.

When the brake pedal switch 30 has been turned ON, a negative decision (NO) is obtained in step S702, and the control flow goes to step S706 to determine whether the brake pedal switch 30 was placed in the OFF state in the last cycle. That is, step S706 is provided to determine whether the brake pedal switch 30 has been turned ON for the first time in the present cycle. If the brake pedal switch 30 was placed in the OFF state in the last cycle, the control flow goes to step S707 to read in the measured time PCT (between the moment at which the accelerator pedal switch 27 was released and the moment at which the brake pedal switch 30 is turned ON), and to reset the timer. Step S707 is followed by step S708 to determine whether the time PCT is equal to or shorter than a shortest one $PCT_{min}$ (minimum time) of the time values PCT which have been measured so far. The shortest time $PCT_{min}$ is stored in the warning control device 10 as the minimum value $PCT_{min}$ (free running time T0). If the time PCT read in step S707 is equal to or shorter than the shortest time $PCT_{min}$, an affirmative decision (YES) is obtained in step S708, and the control flow goes to step S7089 and S710 to set the time PCT as the minimum value $PCT_{min}$, that is, to update the free running time $PCT_{min}$=T0. If the time PCT is longer than the shortest time $PCT_{min}$, a negative decision (NO) is obtained in step S708, and the free running time $PCT_{min}$ is not updated.

In the embodiment of FIG. 16, the minimum value of the times PCT which have been measured is used as the free running time T0. However, an average of the times PCT measured in the past may be used as the free running time T0. The free running time T0 thus determines reflects not only the locomotive capacity of the vehicle operator but also the mental factors of the vehicle operator.

In the illustrated embodiments described above, only the specific-deceleration coefficient Kb is changed according to the friction coefficient of the roadway surface, the free running time T0 and the critical time T0' may also be changed according to the friction coefficient. For instance, the warning threshold distance Dw is desirably made longer when the vehicle is running on a snow-covered roadway surface.

In the illustrated embodiments, the relationships of the free running time T0 with the specific-deceleration coefficient Kb and the critical time T0' are stored in the data storage portion 14. However, the relationship of the free running time T0 with one of the specific-deceleration coefficient Kb and critical time T0', or the relationship between the specific-deceleration coefficient Kb and the critical time T0' may be stored in the data storage portion 14. In this case, the critical time T0' may be set by the vehicle operator.

While the brake operating characteristic-value relationships are prepared based on experimental data so as to have a tendency of increasing the warning threshold distance Dw, as indicated by solid lines in the graphs of FIGS. 3 and 4, the characteristic-value relationships may be prepared based on average values of the experimental data. This arrangement permits generation of a warning signal at a timing that suits average vehicle operators having ordinary a brake operating characteristic or habit. Further, the characteristic-value relationships may be prepared so as to have a tendency of shortening the warning threshold distance Dw. This arrangement permits generation of the warning signal at a timing suitable for increasing the operating safety of the vehicle.

The various equations, inequalities or formulas used to determine the warning threshold distance Dw are not limited to those in the illustrated embodiments. The warning threshold distance Dw may be determined according to any formulas which include at least one of the critical time T0' and the specific-deceleration coefficient Kb.

The principle of the present invention is applicable to a running of the present vehicle 40 so as to follow or trace the front vehicle 42, as well as a normal running of the present vehicle 40.

While the presently preferred embodiments of this invention have been described in detail, for illustrative purpose only, it is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A warning apparatus for an automotive vehicle, operable to generate a warning signal when a distance between the vehicle and an object existing in front of the vehicle is shorter than a predetermined threshold value, comprising:

a characteristic-value storage portion which stores at least one characteristic-value relationship between at least two of a plurality of brake operating characteristic values relating to a braking operation by an operator of the vehicle to brake the vehicle; and a threshold-value determining portion operable to determine said threshold value of said distance, on the basis of: an estimated braking state of the vehicle estimated on the basis of said at least one characteristic-value relationship stored in said characteristic-value storage portion; and at least one of a running-state quantity indicative of a running state of the vehicle, and a moving-state quantity indicative of a moving state of said object, wherein said at least one characteristic-value relationship stored in said characteristic-value storage portion is represented by an envelope of experimental data indicative of said at least two of said plurality of brake operating characteristic values.

2. A warning apparatus according to claim 1, wherein said characteristic-value storage portion stores at least two characteristic-value relationships of one of said plurality of brake operating characteristic values with respective at least two other characteristic values of said plurality of brake operating characteristic values, and said threshold-value determining portion is operable to estimate at least two braking-state quantities indicative of a braking state of the present vehicle, on the basis of said one brake operating characteristic value and said characteristic-value relationships.

3. A warning apparatus according to claim 1, wherein said characteristic-value storage portion stores at least one characteristic-value relationship selected from a plurality of relationships between or among at least two of: (a) an operating-speed quantity relating to a speed of said braking operation by the operator to brake the vehicle; (b) a vehicle-deceleration quantity relating to a deceleration value of the vehicle as a result of said braking operation by the operator to brake the vehicle; and (c) a relative-position quantity relating to a relative position between the vehicle and said object upon said braking operation.

4. A warning apparatus according to claim 1, wherein said characteristic-value storage portion stores at least one characteristic-value relationship selected from a plurality of relationships between or among at least two of: (a) a desired-safety-margin quantity relating to a safety margin desired by the operator in connection with said braking operation by the operator to brake the vehicle, (b) a required-vehicle-deceleration quantity relating to a required deceleration value of the vehicle as felt by the operator upon said braking operation, and (c) a critical-relative-position quantity relating to a relative position between the vehicle and said object at which the operator feels it necessary to initiate said braking operation.

5. A warning apparatus according to claim 1, wherein said characteristic-value storage portion stores at least one characteristic-value relationship selected from a plurality of relationships between or among at least two of: (a) a promptness quantity relating to promptness of the operator to perform said braking operation; (b) an operating-force quantity relating to an operating force to be produced by the operator to perform said braking operation; and (c) a critical-relative-position quantity relating to a relative position between the vehicle and said object at which the operator feels it necessary to initiate said braking operation.

6. A warning apparatus according to claim 1, wherein said characteristic-value storage portion stores at least one of:

(a) a relationship between a braking-delay time between a moment at which the operator feels it necessary to initiate said braking operation and a moment at which said braking operation is actually initiated, and a deceleration value of the vehicle to be established by said braking operation; and (b) a relationship between said braking-delay time and a relative-position quantity relating to a relative position between the vehicle and said object.

7. A warning apparatus according to claim 1, further comprising a characteristic-value setting portion manually operable by the operator to set at least one of said at least two of said plurality of brake operating characteristic values, and said threshold-value determining portion is operable to obtain said estimated braking state of the vehicle on the basis of said at least one brake operating characteristic value set by said characteristic-value setting portion and said at least one characteristic-value relationship stored in said characteristic-value storage portion, said threshold-value determining portion determining said threshold value of said distance on the basis of said estimated braking state obtained.

8. A warning apparatus according to claim 1, further comprising:

a friction-coefficient obtaining portion operable to obtain a friction coefficient of a roadway surface on which the vehicle is running; and a characteristic-value-relationship determining portion operable to determine said at least one characteristic-value relationship on the basis of said friction coefficient obtained by said friction-coefficient obtaining portion.

9. A warning apparatus according to claim 1, further comprising:

a running-environment obtaining portion operable to obtain a running environment of the vehicle; and a characteristic-value-relationship determining portion operable to determine said at least one characteristic-value relationship on the basis of said running environment obtained by said running-environment obtaining portion.

10. A warning apparatus according to claim 1, further comprising:

a running-state obtaining portion operable to obtain said running state of the vehicle; and a characteristic-value-relationship determining portion operable to determine said at least one characteristic-value relationship on the basis of said running state obtained by said running-state obtaining portion.

11. A warning apparatus according to claim 1, wherein the vehicle has a controlled running mode in which said running state is controlled on the basis of a relative-position quantity relating to a relative position between the vehicle and said object, and said threshold-value determining portion determines said threshold value of said distance such that the determined threshold value is larger when the vehicle is running in said controlled running mode, than when the vehicle is not running in said controlled running mode.

12. A warning apparatus according to claim 1, further comprising a safety detecting portion operable to determine whether a positional relationship between the vehicle and said object falls within a predetermined safe region, and said threshold-value determining portion determines said threshold value of said distance when said safety detecting portion determines that said positional relationship does not fall within said safe region.

13. A warning apparatus according to claim 1, further comprising a running control portion operable to control said running state of the vehicle on the basis of a relative-position quantity relating to a relative position between the vehicle and said object.

14. A warning apparatus according to claim 1, wherein said at least two of said plurality of brake operating characteristic values include (i) a braking-delay time between a moment at which the operator feels it necessary to initiate said braking operation and a moment at which said braking is actually initiated, (ii) a deceleration value of the vehicle to be established by said braking operation, and (iii) a relative-position quantity relating to a relative position between the vehicle and said object, and said at least one characteristic-value relationship includes a first relationship between said braking-delay time and said deceleration value, and a second relationship between said braking-delay time and said relative-position quantity.

15. A warning apparatus according to claim 14, wherein said first relationship is represented by an envelope of highest values of said deceleration value obtained by experiment for each value of said braking-delay time.

16. A warning apparatus according to claim 14, wherein said second relationship is represented by an envelope of smallest value of said relative-position quantity obtained by experiment for each value of said braking-delay time.

17. A warning apparatus according to claim 14, further comprising a characteristic-value setting portion manually operable by the operator to set said braking-delay time, and said threshold-value determining portion is operable to obtain said estimated braking state of the vehicle on the basis of said braking-delay time set by said characteristic-value setting portion, and said first and second relationships stored in said characteristic-value storage portion.

* * * * *